(12) United States Patent
Soryal et al.

(10) Patent No.: US 12,393,643 B2
(45) Date of Patent: Aug. 19, 2025

(54) AUDIO ATTACK MITIGATION SYSTEM WITH ALARM INDICATION

(71) Applicant: SimpliSafe, Inc., Boston, MA (US)

(72) Inventors: Joseph Soryal, Glendale, NY (US); Dylan C. Reid, Atlanta, GA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/623,085

(22) Filed: Apr. 1, 2024

(65) Prior Publication Data

US 2024/0248958 A1   Jul. 25, 2024

Related U.S. Application Data

(63) Continuation of application No. 18/117,622, filed on Mar. 6, 2023, now Pat. No. 11,947,630, which is a continuation of application No. 17/218,635, filed on Mar. 31, 2021, now Pat. No. 11,599,754.

(51) Int. Cl.
G06F 18/22        (2023.01)
G06F 18/20        (2023.01)
G06F 18/21        (2023.01)
G06V 30/24        (2022.01)

(52) U.S. Cl.
CPC ............ G06F 18/217 (2023.01); G06F 18/22 (2023.01); G06F 18/285 (2023.01); G06V 30/2504 (2022.01)

(58) Field of Classification Search
CPC ...... G06F 18/217; G06F 18/22; G06F 18/285; G06V 30/2504
See application file for complete search history.

(56) References Cited

U.S. PATENT DOCUMENTS

| | | | |
|---|---|---|---|
| 2006/0114058 A1* | 6/2006 | Chen ...................... | H03F 3/181 330/10 |
| 2007/0046503 A1* | 3/2007 | van Baarsen ........... | H03M 5/22 341/50 |
| 2012/0109646 A1* | 5/2012 | Bak ........................ | G10L 15/065 704/229 |

(Continued)

OTHER PUBLICATIONS

U.S. Notice of Allowance dated Oct. 5, 2022 in U.S. Appl. No. 17/218,635.

(Continued)

*Primary Examiner* — Sam Bhattacharya
(74) *Attorney, Agent, or Firm* — Pierce Atwood LLP

(57) ABSTRACT

Concepts and technologies disclosed herein are directed to image classification attack mitigation. According to one aspect of the concepts and technologies disclosed herein, a system can obtain an original image and reduce a resolution of the original image to create a reduced resolution image. The system can classify the reduced resolution image and output a first classification. The system also can classify the original image via deep learning image classification and output a second classification. The system can compare the first classification and the second classification. In response to determining that the first classification and the second classification match, the system can output the second classification of the original image. In response to determining that the first classification and the second classification do not match, the system can output the first classification of the original image.

20 Claims, 14 Drawing Sheets

(56) References Cited

U.S. PATENT DOCUMENTS

| | | |
|---|---|---|
| 2013/0268956 A1 | 10/2013 | Recco |
| 2019/0087677 A1 | 3/2019 | Wolf et al. |
| 2019/0205649 A1 | 7/2019 | Ananthanarayanan et al. |
| 2020/0019128 A1 | 1/2020 | Brooks et al. |
| 2021/0092280 A1 | 3/2021 | Nishimura et al. |
| 2021/0343291 A1* | 11/2021 | Agarwal ................. G10L 15/22 |
| 2022/0013118 A1* | 1/2022 | Hwang ................. G10L 19/018 |
| 2022/0122614 A1 | 4/2022 | Pelecanos et al. |
| 2022/0138947 A1 | 5/2022 | Kuo |
| 2022/0148598 A1* | 5/2022 | Krishnamoorthy ..... G10L 15/20 |

OTHER PUBLICATIONS

U.S. Office Action dated Jun. 24, 2022 in U.S. Appl. No. 17/218,635.

\* cited by examiner

AUDIO ATTACK MITIGATION SYSTEM WITH ALARM INDICATION

CROSS-REFERENCE TO RELATED APPLICATIONS

This application is a continuation of U.S. patent application Ser. No. 18/117,622, filed Mar. 6, 2023, which is a continuation of U.S. patent application Ser. No. 17/218,635, filed Mar. 31, 2021 (now U.S. Pat. No. 11,599,754). All sections of the aforementioned application(s) and patent(s) are incorporated herein by reference in their entirety.

BACKGROUND

The field of computer vision utilizes artificial neural networks inspired by the organization of neurons in the visual cortex of the human brain. Convolutional neural networks ("CNNs") are the most widely used artificial neural networks for analyzing and classifying images. CNNs use deep learning algorithms to assign weights to various aspects or objects depicted in an image to differentiate the image from other images and to assign a classification to the image. Image classification has become the most prevalent use case for artificial intelligence. As with any prevalent technology, attackers will find ways to exploit the technology for malicious purposes.

Attackers can breach image classification systems and insert malicious pixels into images in an image feed to trick the artificial intelligence to misinterpret an image and provide an incorrect classification. For example, attackers may want to cause an image classification system to interpret an image of an animal as a gun. In particular, attackers can exploit the process of elimination that the image classification system uses when estimating which label to apply to an image. Characteristics can be extracted from the image that is most likely to be classified as a first thing, and then applied imperceptibly to images of a second thing so that images of the first thing become classified as the second thing. The mathematics that power the elimination process allow an attacker to systematically push a poisoned image towards a target classification.

SUMMARY

Concepts and technologies disclosed herein are directed to image classification attack mitigation. According to one aspect of the concepts and technologies disclosed herein, a system can obtain an original image and reduce a resolution of the original image to create a reduced resolution image. The system can classify the reduced resolution image and output a first classification. The system also can classify the original image via deep learning image classification and output a second classification. The system can compare the first classification and the second classification. In response to determining that the first classification and the second classification match, the system can output the second classification of the original image. In response to determining that the first classification and the second classification do not match, the system can output the first classification of the original image.

The system can attempt to reconstruct the original image from the first classification. The system can compare a reconstructed image to the original image. In response to determining that the reconstructed image matches the original image, the system can determine that the original image was accurately processed. In response to determining that the reconstructed image does not match the original image, the system can adjust the resolution of the original image and repeat classification.

In some embodiments, the system can classify the reduced resolution image, at least in part, by performing an elimination operation using color as a primary classifier and shape as a secondary classifier. In some embodiments, the system can slice the reduced resolution image into individual items and search for common coexisting items.

In some embodiments, the system can classify the reduced resolution image based upon other factors. For example, the system can perform an environment context awareness check on the reduced resolution image, a situational context awareness check on the reduced resolution image, a textual relationship check on the reduced resolution image, an audible relationship check on the reduced resolution image, a user profile biasing on the reduced resolution image, and/or a relative dimension and mathematical ratio analysis on the reduced resolution image.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Referring now FIG. 1, a block diagram illustrating an image classification attack mitigation ("ICAM") system 100 in which aspects of the concepts and technologies disclosed herein can be implemented will be described. The ICAM system 100 can be implemented, at least in part, in a computer system, such as an example computer system 1000 that is illustrated and described with reference to FIG. 10. The ICAM system 100 alternatively can be implemented, at least in part, in a containerized architecture, such as an example containerized cloud architecture 1100 that is illustrated and described herein with reference to FIG. 11. The ICAM system 100 can be implemented, at least in part, in a virtualized cloud architecture, such as an example virtualized cloud architecture 1200 that is illustrated and described herein with reference to FIG. 12. Moreover, aspects of the ICAM system 100 can be implemented, at least in part, through the use of machine learning technologies, such as via an example machine learning system 1300 that is illustrated and described herein with reference to FIG. 13. Those skilled in the will appreciate that the ICAM system 100 can be deployed in various ways on different architectures based upon the needs of a given implementation. Accordingly, the examples set forth herein should not be construed as being limiting to the manner in which the ICAM system 100 is implemented.

Figure 1:
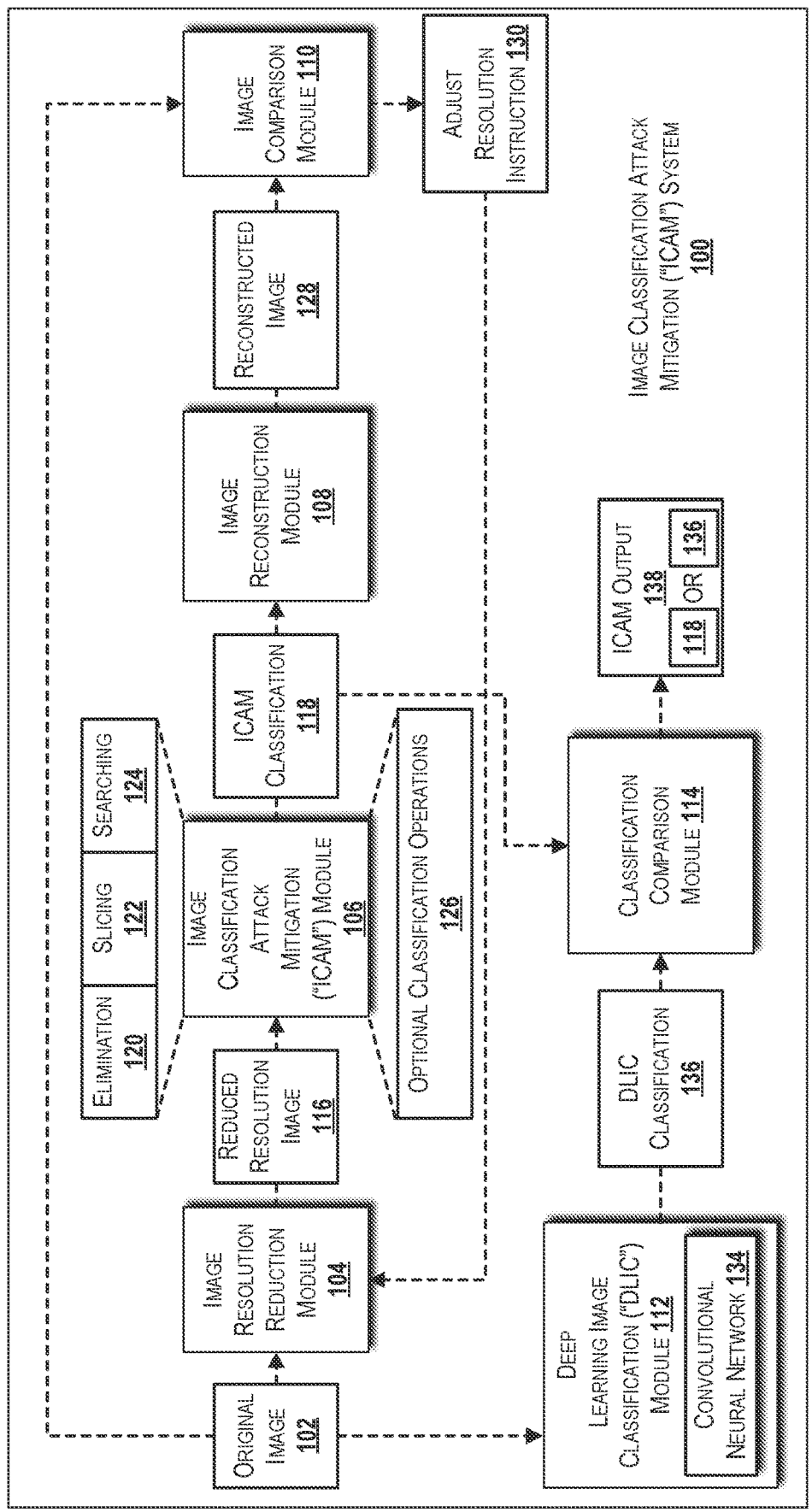
FIG. 1 is a block diagram illustrating an image classification attack mitigation system in which aspects of the concepts and technologies disclosed herein can be implemented.

In the example illustrated in FIG. 1, the ICAM system 100 can receive an original image 102. The original image 102 is a digital image. The original image 102 can be a digital photograph, a digital image created by a scanner, a digital image created by software, or other digital image. The original image 102 can depict anything that is capable of classification. As such, the subject matter depicted in the original image 102 is not limited to any particular person, place, or thing. The original image 102 can have any matrix size (e.g., width and height), any pixel size, any resolution (e.g., in terms of pixels per inch "PPI"), any color (e.g., binary, gray-scale, color, or multispectral), any pixel bit depth, and any other image parameters. The original image 102 can be in any file format, some examples of which include, but are not limited to, Tagged Image File Format ("TIFF"), Graphics Interchange Format ("GIF"), Joint Photographic Experts Group ("JPEG") format, Portable Pix Map ("PPM"), Windows Bitmap ("BMP"), Portable Network Graphics ("PNG"), proprietary file formats, other standardized file formats, and the like.

The illustrated ICAM system 100 includes a plurality of modules, each of which can include instructions that can be executed by one or more processors (see FIGS. 10-12) of the ICAM system 100. Alternatively, the plurality of modules can be executed by different systems that are operating in communication with one another. In particular, the illustrated ICAM system 100 includes an image resolution reduction module 104, an ICAM module 106, an image reconstruction module 108, an image comparison module 110, a deep learning image classification ("DLIC") module 112, and a classification comparison module 114. Those skilled in the art will appreciate the numerous ways the disclosed modules can be configured, and as such, the illustrated example described herein should not be construed as being limiting in any way.

The image resolution reduction module 104 can receive the original image 102 and reduce the resolution such that fine details are obscured for analysis. The output of the image resolution reduction module 104 is a reduced resolution image 116. A pre-determined percentage of resolution reduction or a set resolution target can be used as the basis for reducing the resolution. The reduced resolution image 116 is used so that the ICAM module 106 can perform classification operations faster than deep learning-based classification that is typically used for image classification.

The ICAM module 106 can receive the reduced resolution image 116 from the image resolution reduction module 104 and begin classification operations to generate an ICAM classification 118. The ICAM classification 118 can be a text-based classification.

In particular, the ICAM module 106 can begin classification of the reduced resolution image 116 by first performing an elimination operation 120 using color as a primary classifier and shape as a secondary classifier. The ICAM module 106 can then perform a slicing operation 122 to slice the reduced resolution image 116 into individual items, and then perform a searching operation 124 to search for common coexisting items associated with the individual items found during the slicing operation 122 (e.g., ocean waves and a lion normally would not coexist in the same image, but ocean waves and a wooden log would be more likely).

The ICAM module 106 can perform one or more optional classification operations 126. The optional classification operations 126 can increase the accuracy of the ICAM classification 118 determined by the ICAM module 106. In some embodiments, the ICAM module 106 can utilize environmental and situational context awareness as one of the optional classification operations 126 to improve classification accuracy. For example, the ICAM module 106 can use the background of the reduced resolution image 116 and its relation to a core subject thereof to determine what is depicted in the original image 102. The ICAM module 106 can attempt to analyze the cohesiveness of individual elements of the reduced resolution image 116 to better determine the theme of the reduced resolution image 116 and elements that logically go together.

In some embodiments, the ICAM module 106 can utilize textual and/or audible relationships as one of the optional classification operations 126 to improve classification accuracy. For example, the ICAM module 106 can consider any text and/or audio associated with the reduced resolution image 116 with the caveat that this information could be misleading. For example, a clear picture of a tree with text on the picture that identifies the tree as a "flower." The ICAM module 106 can build a historical trust model for the accuracy of the textual and/or audible description of the images obtained from certain sources.

In some embodiments, the ICAM module 106 can utilize user profile interests as one of the optional classification operations 126. The classification of an image that depicts an object that is difficult to classify may be aided by a user profile associated with a user who is associated with the image (e.g., in the metadata of the image). In other words, the ICAM module 106 can bias the classification of the reduced resolution image 116 to an object that is associated with an interest of the user. For example, a user profile that indicates boxing as an interest of a user may cause the ICAM module 106 to bias towards boxing-related objects such as boxing gloves.

In some embodiments, the ICAM module 106 can evaluate and determine various objects independently based on relative dimensions and/or mathematical ratios as one of the optional classification operations 126. The optional classification operations 126 can include other classification operations not explicitly described herein. It is contemplated that, over time, use of the ICAM module 106 may reveal additional optional classification operations 126 that can be used (including experimental use) to improve the accuracy of the ICAM classification 118.

The image reconstruction module 108 can receive the ICAM classification 118 from the ICAM module 106. The image reconstruction module 108 can attempt to reconstruct the original image 102 based upon the ICAM classification 118 to create a reconstructed image 128.

The image comparison module 110 can receive the reconstructed image 128 from the image reconstruction module 108. The image comparison module 110 can compare the reconstructed image 128 to the original image 102 to determine if the original image was classified accurately. If the image comparison module 110 determines that the comparison is close enough, the image comparison module 110 can determine that the original image 102 was classified accurately. Whether the reconstructed image 128 is close enough to the original image 102 can be determined based upon a similarity threshold. The similarity threshold can be defined as a minimum percentage of matching pixels. For example, if at least 75% of the pixels of the reconstructed image 128 match the original image 102, then the image comparison module 110 can conclude that the reconstructed image 128 is close enough to the original image 102. Alternatively, the image comparison module 110 can utilize machine learning to learn correlations among images in terms of coarse details such as shape, subject type (e.g., animal, vehicle, building, person, etc.), and/or other coarse details. For example, two images, one showing a car and the other showing a truck may be considered "close enough," but two images, one showing a car and the other showing a motorcycle may not be considered "close enough." The image comparison module 110 can alternatively utilize one or more mathematical formulas such as standard deviation or mean absolute deviation. Those skilled in the art will appreciate other methods of comparing the reconstructed image 128 and the original image 102. As such, the aforementioned examples should not be construed as being limiting in any way.

If, however, the image comparison module 110 determines that the comparison is not close enough, the image comparison module 110 can generate and send an adjust resolution instruction 130 to the image resolution reduction module 104. The adjust resolution instruction 130 can instruct the image resolution reduction module 104 to adjust the resolution of the reduced resolution image 116. The ICAM module 106, the image reconstruction module 108, and the image comparison module 110 can then re-process the reduced resolution image 116. This process continues until the image comparison module 110 determines that the comparison between the original image 102 and the reconstructed image 128 is close enough.

The DLIC module 112 also processes the original image 102. In some embodiments, the DLIC module 112 can process the original image 102 in parallel to the ICAM module 106, although serial processing in which the ICAM module 106 processes the original image 102 before the DLIC module 112, or vice versa, is also contemplated. The DLIC module 112 can implement a convolutional neural network ("CNN") 134 to classify the original image 102 and output a DLIC classification 136. The CNN 134 is an artificial neural network that can be used to analyze and classify the original image 102. The CNN 134 can use one or more deep learning algorithms to assign weights to various aspects or objects depicted in the original image 102 to differentiate the original image 102 from other images and to assign the DLIC classification 136 to the original image 102. CNNs are well-known and in common use for image classification tasks. As such, additional details about the CNN 134 are not described herein.

The DLIC module 112 provides the DLIC classification 136 to the classification comparison module 114. The classification comparison module 114 can also receive the ICAM classification 118. The classification comparison module 114 can compare the ICAM classification 118 and the DLIC classification 136. If the ICAM classification 118 and the DLIC classification 136 match, the classification comparison module 114 outputs an ICAM output 138 with the DLIC classification 136. If, however, the ICAM classification 118 and the DLIC classification 136 do not match, the classification comparison module 114 outputs the ICAM output 138 with the ICAM classification 118. In some embodiments, the ICAM system 100 can notify one or more other systems and/or devices (not shown) if the DLIC classification 136 is not the same as the ICAM classification 118, which indicates that the original image 102 contains malicious content (e.g., one or more malicious pixels).

Figure 2:
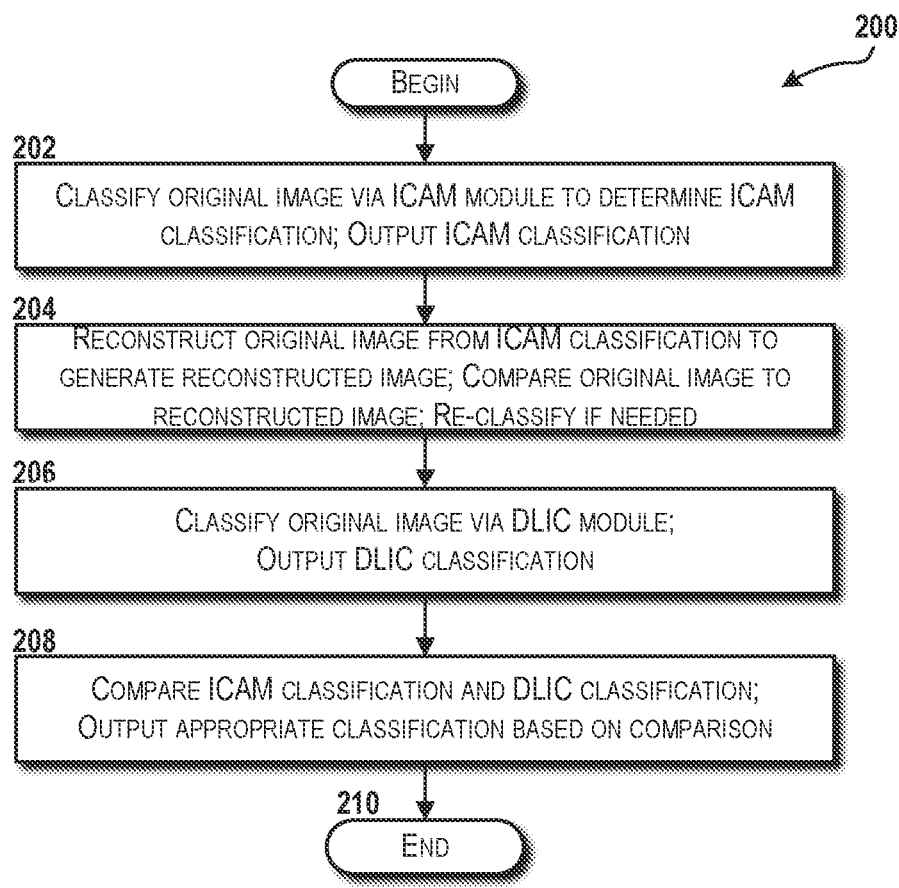
FIG. 2 is a flow diagram illustrating aspects of a method for mitigating image classification attacks, according to an illustrative embodiment.

Turning now to FIG. 2, a method 200 for mitigating image classification attacks will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or multiple processors of one or more systems and/or one or more devices disclosed herein to perform one or more operations and/or causing the processor to direct other components of the computing system or device to perform one or more of the operations.

The method 200 begins and proceeds to operation 202. At operation 202, the ICAM system 100 executes the ICAM module 106 to classify the original image 102 to determine the ICAM classification 118. Also at operation 202, the ICAM module 106 outputs the ICAM classification 118. Additional details in this regard will be described herein below with reference to FIG. 3.

From operation 202, the method 200 proceeds to operation 204. At operation 204, the ICAM system 100 executes the image reconstruction module 108 in an attempt to reconstruct the original image 102 based on the ICAM classification 118. The image reconstruction module 108 receives the ICAM classification 118 from the ICAM module 106 and attempts to reconstruct the original image 102 from the ICAM classification 118 to create the reconstructed image 128. The output of operation 204 is the reconstructed image 128. At operation 204, the ICAM system 100 also executes the image comparison module 110 to compare the original image 102 to the reconstructed image 128. If the original image 102 and the reconstructed image 128 are close enough, the method 200 proceeds to operation 206. If the original image 102 and the reconstructed image 128 are not close enough, the image comparison module 110 requests, via the adjust resolution instruction 130, the image resolution reduction module 104 to adjust the resolution of the original image 102 and return to operation 202. After the image comparison module 110 determines that the original image 102 and the reconstructed image 128 are close enough, the method 200 proceeds to operation 206. Additional details in this regard will be described herein below with reference to FIG. 4.

At operation 206, the ICAM system 100 executes the DLIC module 112 to classify the original image 102 to determine the DLIC classification 136. Also at operation 206, the DLIC module 112 outputs the DLIC classification 136. From operation 206, the method 200 proceeds to operation 208. At operation 208, the ICAM system 100 executes the classification comparison module 114 to compare the ICAM classification 118 and the DLIC classification 136. Also at operation 208, the ICAM system 100 outputs the appropriate classification based on the comparison. If the DLIC classification 136 matches the ICAM classification 118, the ICAM system 100 can output the DLIC classification 136. If the DLIC classification 136 does not match the ICAM classification 118, the ICAM system 100 can output the ICAM classification 118. Additional details in this regard will be described herein below with reference to FIG. 5.

From operation 208, the method 200 proceeds to operation 210. At operation 210, the method 200 can end.

Figure 3:
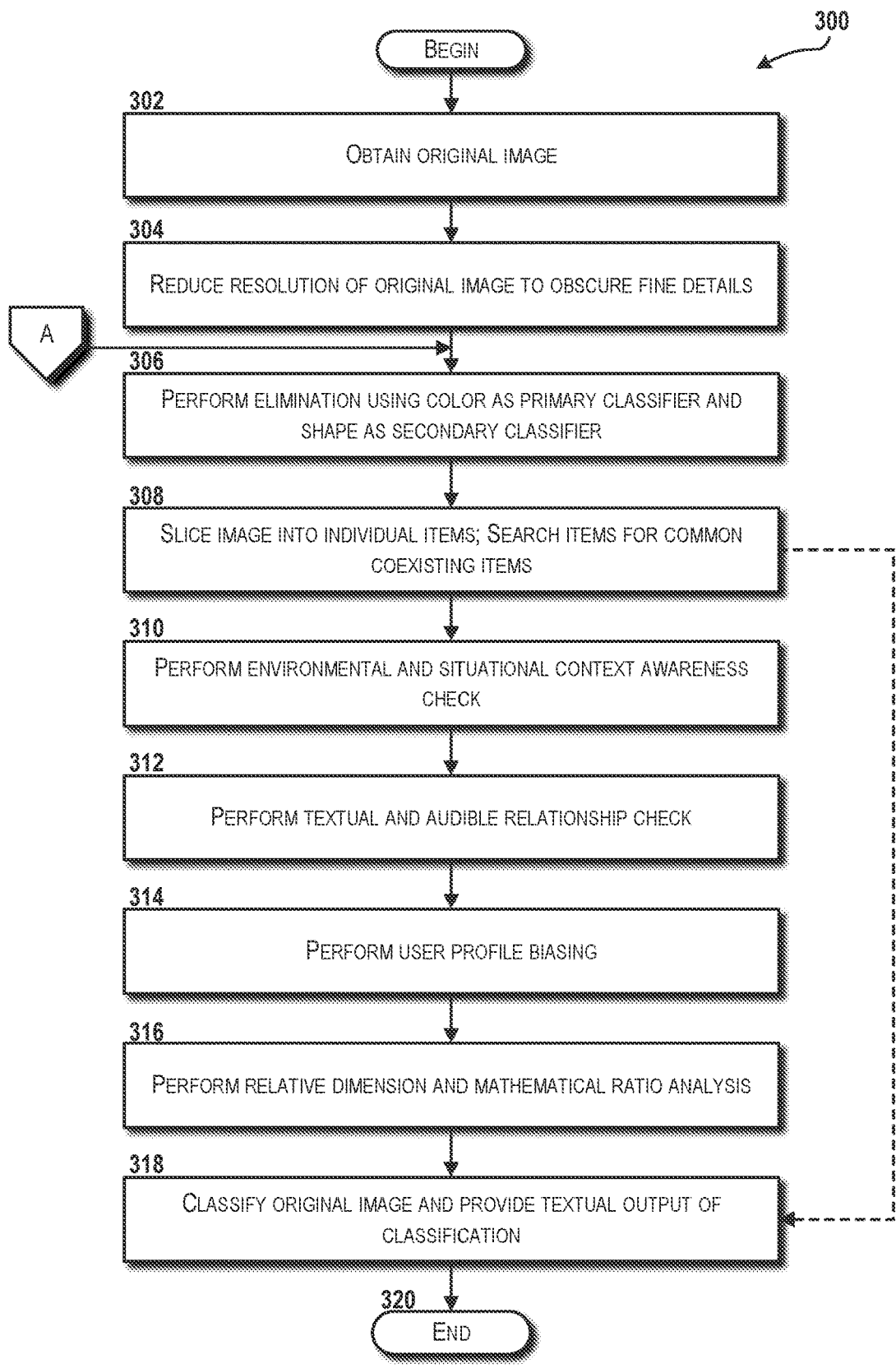
FIG. 3 is a flow diagram illustrating aspects of a method for classifying an image to determine an attack mitigation image classification, according to an illustrative embodiment.

Turning now to FIG. 3, a method 300 for classifying the original image 102 to determine the ICAM classification 118 will be described, according to an illustrative embodiment. The method 300 begins and proceeds to operation 302. At operation 302, the ICAM system 100 obtains the original image 102. From operation 302, the method 300 proceeds to operation 304. At operation 304, the ICAM system 100 executes the image resolution reduction module 104 to reduce the resolution of the original image 102 to obscure fine details. The resolution reduction can be based on a pre-determined percentage by which to reduce the resolution of the original image 102. Alternatively, the resolution reduction can be based on a pre-established target resolution. Other resolution reduction parameters are contemplated. The image resolution reduction module 104 then outputs the reduced resolution image 116.

From operation 304, the method 300 proceeds to operation 306. At operation 306, the ICAM system 100 executes the ICAM module 106 to perform the elimination operation 120. In particular, the ICAM system 100 can perform the elimination operation 120 based on color as a primary classifier and shape as a secondary classifier. From operation 306, the method 300 proceeds to 308. At operation 308, the ICAM system 100 executes the ICAM module 106 to perform the slicing operation 122. In particular, the ICAM system 100 can slice (i.e., divide) the reduced resolution image 116 into individual items. Also at operation 308, the ICAM system 100 can search the items for common coexisting items. In some embodiments, the method 300 can then proceed to operation 318 described below. Alternatively, the method 300 can continue by performing one or more of the optional classification operations 126, which are described below as operations 310, 312, 314, 316, and 318. These operations can increase the accuracy of the ICAM classification 118 output by the ICAM module 106.

From operation 308, the method 300 proceeds to operation 310. At operation 310, the ICAM system 100 executes the ICAM module 106 to perform an environment and situational context awareness check. For example, the ICAM module 106 can use the background of the reduced resolution image 116 and its relation to a core subject thereof to determine what is depicted in the original image 102. The ICAM module 106 can attempt to analyze the cohesiveness of individual elements of the reduced resolution image 116 to better determine the theme of the reduced resolution image 116 and elements that logically go together.

From operation 310, the method 300 proceeds to operation 312. At operation 312, the ICAM system 100 executes the ICAM module 106 to perform a textual and audible relationship check. In some embodiments, the ICAM module 106 can utilize textual and/or audible relationships as one of the optional classification operations 126 to improve classification accuracy. For example, the ICAM module 106 can consider any text and/or audio associated with the reduced resolution image 116 with the caveat that this information could be misleading. For example, a clear picture of a tree with text on the picture that identifies the tree as a "flower." The ICAM module 106 can build a historical trust model for the accuracy of the textual and/or audible description of the images obtained from certain sources.

From operation 312, the method 300 proceeds to operation 314. At operation 314, the ICAM system 100 executes the ICAM module 106 to perform user profile biasing. The classification of an image that depicts an object that is difficult to classify may be aided by a user profile associated with a user who is associated with the image (e.g., in the metadata of the image). In other words, the ICAM module 106 can bias the classification of the reduced resolution image 116 to an object that is associated with an interest of the user. For example, a user profile that indicates boxing as an interest of a user may cause the ICAM module 106 to bias towards boxing-related objects such as boxing gloves.

From operation 314, the method 300 proceeds to operation 316. At operation 316, the ICAM system executes the ICAM module to perform a relative dimension and mathematical ratio analysis. In some embodiments, the ICAM module 106 can evaluate and determine various objects independently based on relative dimensions and/or mathematical ratios as one of the optional classification operations 126. The optional classification operations 126 can include other classification operations not explicitly described herein. It is contemplated that, over time, use of the ICAM module 106 may reveal additional optional classification operations 126 that can be used (including experimental use) to improve the accuracy of the ICAM classification 118.

From operation 316, the method 300 proceeds to operation 318. At operation 318, the ICAM system 100 executes the ICAM module 106 to classify the original image 102 and provide a textual output of the ICAM classification 118.

From operation 318, the method 300 proceeds to operation 320. The method 300 can end at operation 320.

Figure 4:
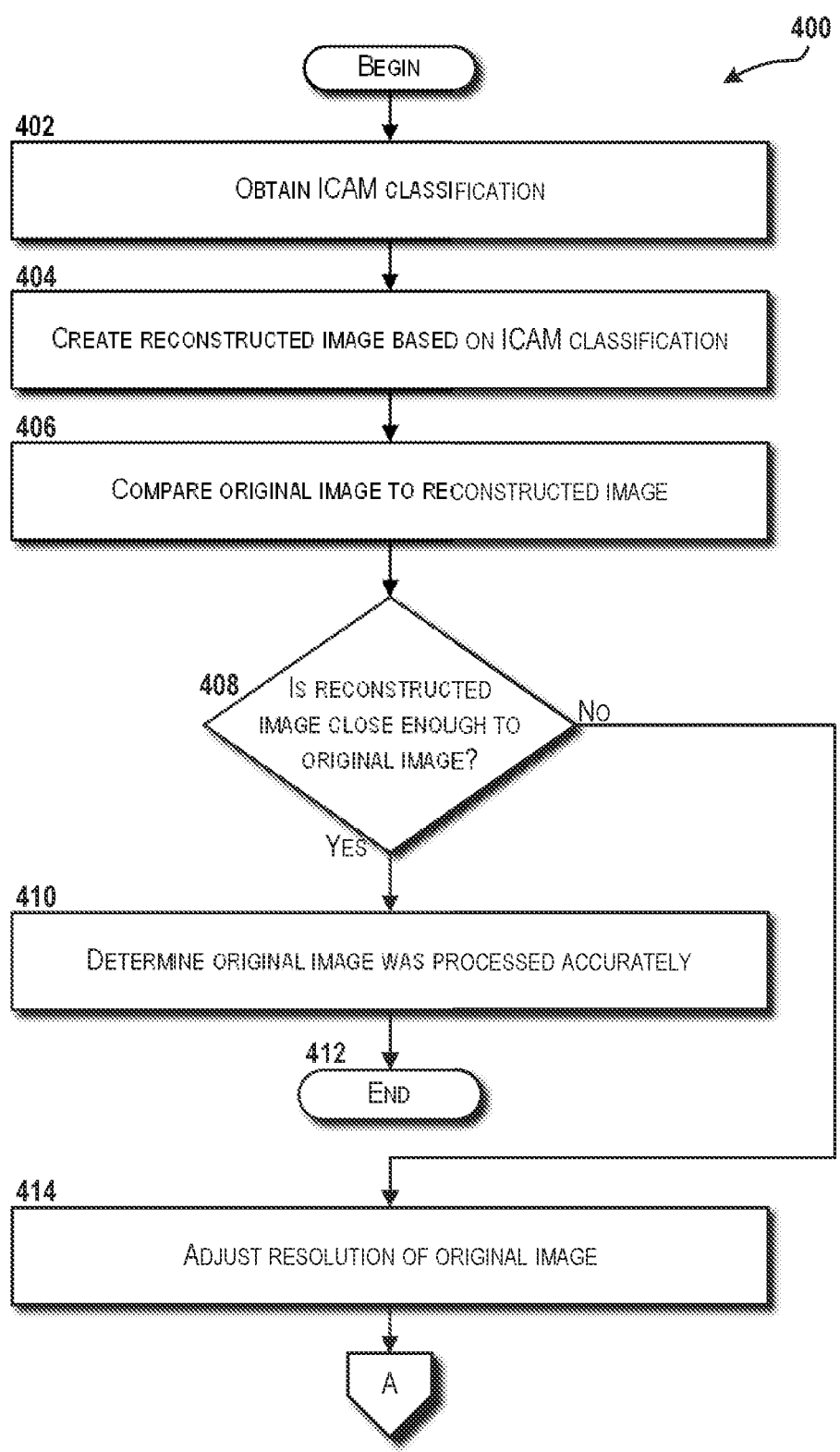
FIG. 4 is a flow diagram illustrating aspects of a method for reconstructing the image from the attack mitigation image classification, according to an illustrative embodiment.

Turning now to FIG. 4, a method 400 for reconstructing the original image 102 from the ICAM classification 118 will be described, according to an illustrative embodiment. The method 400 begins and proceeds to operation 402. At operation 402, the ICAM system 100 executes the image reconstruction module 108 to obtain the ICAM classification 118. From operation 402, the method 400 proceeds to operation 404. At operation 404, the ICAM system 100 executes the image reconstruction module 108 to create the reconstructed image 128 based on the ICAM classification 118.

From operation 404, the method 400 proceeds to operation 406. At operation 406, the ICAM system 100 executes the image comparison module 110 to compare the original image 102 to the reconstructed image 128. From operation 406, the method 400 proceeds to operation 408. At operation 408, the ICAM system 100 executes the image comparison module 110 to determine if the reconstructed image 128 is close enough to the original image 102. If the image comparison module 110 determines that the reconstructed image 128 is close enough to the original image 102, the method 400 can proceed to operation 410. At operation 410, the image comparison module 110 determines that the original image 102 was processed accurately. From operation 410, the method 400 proceeds to operation 412. The method 400 can end at operation 412.

Returning to operation 408, if the image comparison module 110 determines that the reconstructed image 128 is not close enough to the original image 102, the method 400 proceeds to operation 414. At operation 414, the ICAM system 100 executes the image resolution reduction module 104 to adjust the resolution of the original image 102. From operation 414, the method 400 returns to operation 306 of the method 300 shown in FIG. 3, which is described above.

Figure 5:
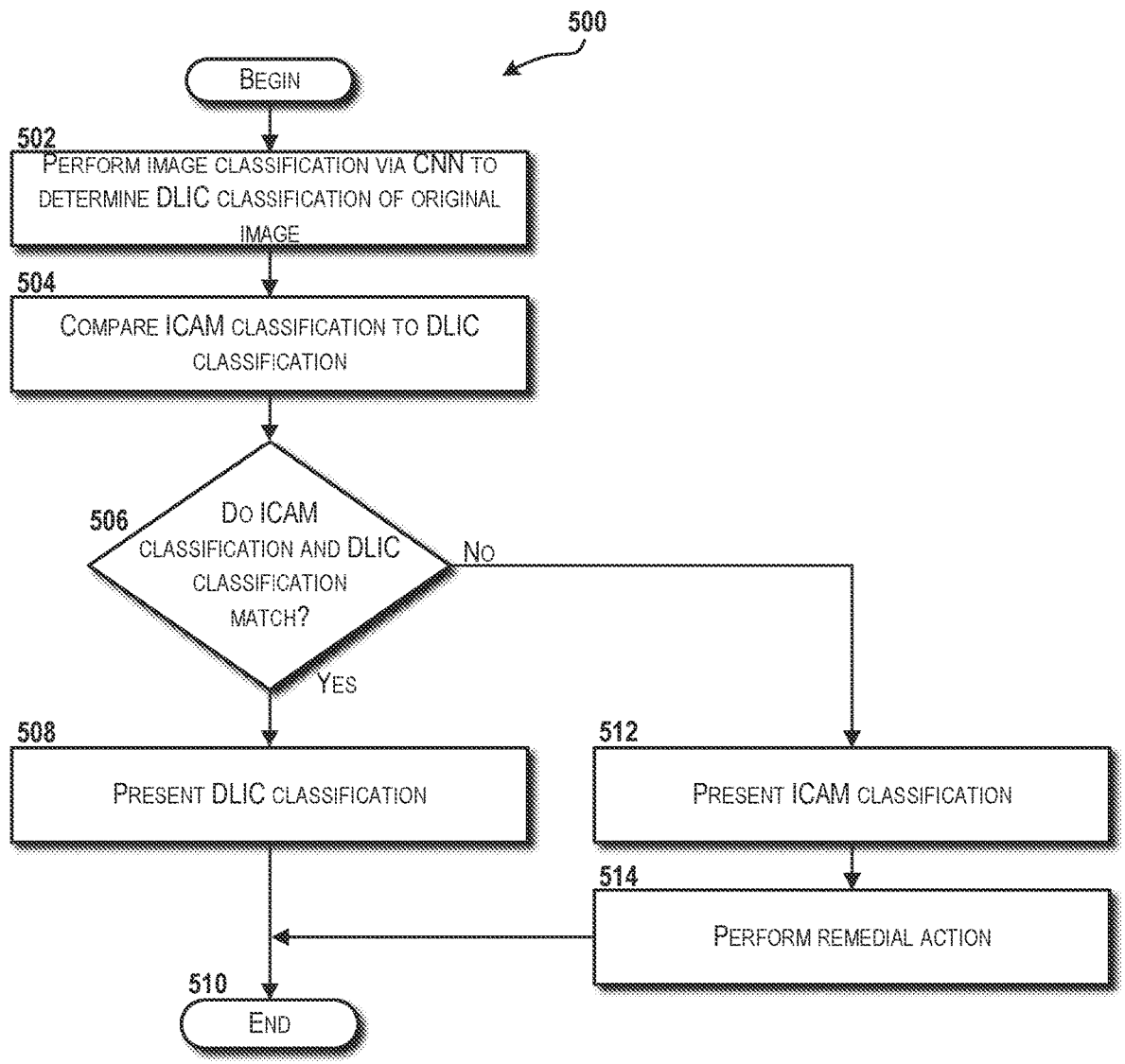
FIG. 5 is a flow diagram illustrating aspects of a method for performing image processing to classify the image and compare the classification to the attack mitigation image classification, according to an illustrative embodiment.

Turning now to FIG. 5, a method 500 for performing image processing to classify the original image 102 using the DLIC module 112 and compare the resultant DLIC classification 136 to the ICAM classification 118 will be described, according to an illustrative embodiment. The method 500 begins and proceeds to operation 502. At operation 502, the ICAM system 100 executes the DLIC module 112 to perform image classification via the CNN 134 to determine the DLIC classification 136 of the original image 102.

From operation 502, the method 500 proceeds to operation 504. At operation 504, the ICAM system 100 executes the classification comparison module 114 to compare the ICAM classification 118 to the DLIC classification 136. From operation 504, the method 500 proceeds to operation 506. At operation 506, the ICAM system 100 executes the classification comparison module 114 to determine if the ICAM classification 118 and the DLIC classification 136 match. If, at operation 506, the classification comparison module 114 determines that the ICAM classification 118 and the DLIC classification 136 match, the method 500 proceeds to operation 508. At operation 508, the classification comparison module 114 provide a textual output of the DLIC classification 136. From operation 508, the method 500 proceeds to operation 510. The method 500 can end at operation 510.

Returning to operation 506, if the classification comparison module 114 determines that the ICAM classification 118 and the DLIC classification 136 do not match, the method 500 proceeds to operation 512. At operation 512, the classification comparison module presents the ICAM classification. From operation 512, the method 500 proceeds to operation 514. At operation 514, ICAM system 100 can perform a remedial action. For example, the ICAM system 100 can notify a user, owner, or other entity associated with the ICAM system 100 that the DLIC module 112 has been compromised. From operation 514, the method 500 can proceed to operation 510. The method 500 can end at operation 510.

Figure 6:
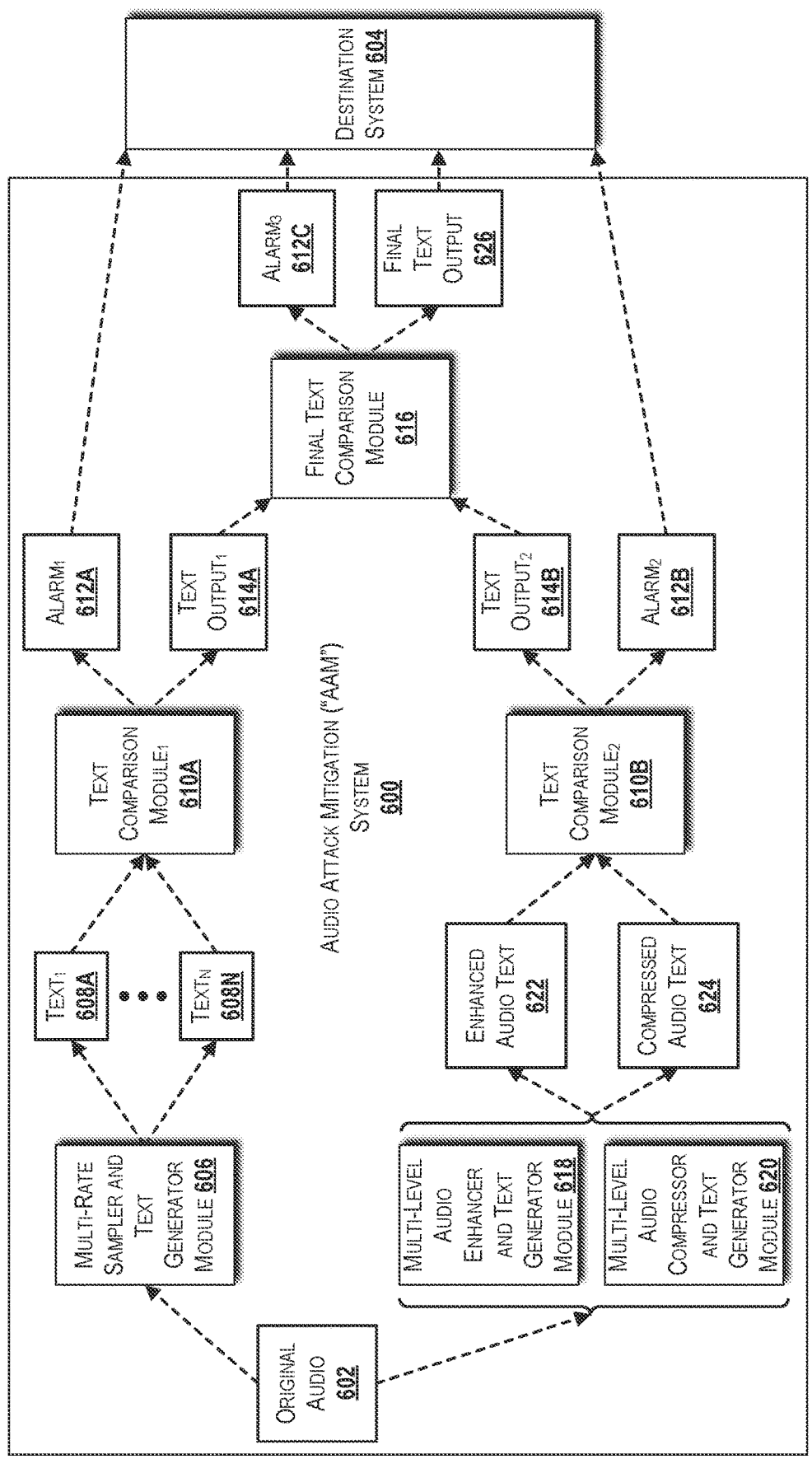
FIG. 6 is a block diagram illustrating an audio attack mitigation system in which aspects of the concepts and technologies disclosed herein can be implemented.

Turning now to FIG. 6, an audio attack mitigation ("AAM") system 600 will be described, according to an illustrative embodiment. The AAM system 600 can be implemented, at least in part, in a computer system, such as an example computer system 1000 that is illustrated and described with reference to FIG. 10. The AAM system 600 alternatively can be implemented, at least in part, in a containerized architecture, such as an example containerized cloud architecture 1100 that is illustrated and described herein with reference to FIG. 11. The AAM system 600 can be implemented, at least in part, in a virtualized cloud architecture, such as an example virtualized cloud architecture 1200 that is illustrated and described herein with reference to FIG. 12. Moreover, aspects of the AAM system 600 can be implemented, at least in part, through the use of machine learning technologies, such as via an example machine learning system 1300 that is illustrated and described herein with reference to FIG. 13. Those skilled in the will appreciate that the AAM system 600 can be deployed in various ways on different architectures based upon the needs of a given implementation. Accordingly, the examples set forth herein should not be construed as being limiting to the manner in which the AAM system 600 is implemented.

In the example illustrated in FIG. 6, the AAM system 600 can receive an original digital audio signal ("original audio") 602. The original audio 602 can be in any file format, some examples of which include, but are not limited to, pulse-code modulation ("PCM"), Waveform Audio File Format ("WAV"), Audio Interchange File Format ("AIFF"), Moving Pictures Expert Group ("MPEG") Audio Layer 3 ("MP3"), MPEG Audio Layer 4 ("MP4"), Advanced Audio Coding ("AAC"), Windows Media Audio ("WMA"), Free Lossless Audio Codec ("FLAC"), Apple Lossless Audio Codec ("ALAC"), proprietary file formats, other standardized file formats, and the like.

The original audio 602 can be compromised. An attacker may inject a malicious undetectable waveform into the original audio 602 such that a receiver will decode and transcribe words that did not exist in the original audio 602. The original audio 602 may be used by a destination system 604 to perform an action. For example, the destination system 604 might be an autonomous vehicle or system thereof. In this example, an audio command such as "stop vehicle" may be compromised with a malicious undetectable waveform that causes the audio command to be transcribed instead as "accelerate vehicle." This may result in the vehicle crashing and injuring or killing the passenger(s). As another example, the destination system 604 might be a voice-enabled home assistant that enables a user to control smart home devices such as a smart lock. In this example, an audio command such as "lock front door" may be compromised with a malicious undetectable waveform that causes the audio command to be transcribed instead as "unlock front door." This may expose the user's home to a robbery or other crime.

The AAM system 600 can receive the original audio 602 and provide the original audio 602 to a multi-rate sampler and text generator module 606. The multi-rate sampler and text generator module 606 can sample the original audio 602 at multiple bit depths (e.g., 8-bit, 16-bit, 24-bit, etc.) and/or sampling rates (e.g., 44.1 kHz, 48 kHz, 96 kHz, 192 kHz, etc.) to create multiple audio samples of the original audio 602. The multi-rate sampler and text generator module 606 transcribes the audio samples into text samples 608A-608N.

A text comparison module$_1$ 610A can receive and compare the text samples 608A-608N to determine if the text samples 608A-608N match. If the text comparison module$_1$ 610A determines that the text samples 608A-608N do not match (i.e., there is some discrepancy among the text samples 608A-608N), the text comparison module$_1$ 610A can generate an alarm$_1$ 612A directed to the destination system 604. If the text comparison module$_1$ 610A determines that the text samples 608A-608N do match, the text comparison module$_1$ 610A can generate a text outputs 614A directed to a final text comparison module 616.

The AAM system 600 can also process the original audio 602 via a multi-level audio enhancer and text generator module 618 and a multi-level audio compressor and text generator module 620. This process can be performed in parallel to the processing described above. Alternatively, the processes can be serialized. The multi-level audio enhancer and text generator module 618 can receive the original audio 602 and enhance the original audio 602 to increase clarity. For example, the multi-level audio enhancer and text generator module 618 can increase the clarity of voice audio by filling in any gaps in the waveform, reconstructing any distortion present in the waveform, and smoothing out the waveform. The multi-level audio enhancer and text generator module 618 can then transcribe the enhanced audio into enhanced audio text 622. The multi-level audio compressor and text generator module 620 can receive the original audio 602 and compress the original audio 602 into lossy compressed audio. The compression process can utilize any lossy compression algorithm to reduce the file size of the original audio 602 by omitting fine details in the audio waveform. The multi-level audio compressor and text generator module 620 can then transcribe the compressed audio into compressed audio text 624.

A text comparison module$_2$ 610B can receive and compare the enhanced audio text 622 and the compressed audio text 624 to determine if they match. The illustrated embodiment shows two separate text comparison modules 610A, 610B, although a single text comparison module 610 is contemplated. If the text comparison module$_2$ 610B determines that the enhanced audio text 622 and the compressed audio text 624 do not match (i.e., there is some discrepancy between the enhanced audio text 622 and the compressed audio text 624), the text comparison module$_2$ 610B can generate an alarm$_2$ 612B directed to the destination system 604. If the text comparison module$_2$ 610B determines that the enhanced audio text 622 and the compressed audio text 624 do match, the text comparison module$_2$ 610B can generate a text output$_2$ 614B directed to the final text comparison module 616.

The final text comparison module 616 can compare the text output$_1$ 614A and the text output$_2$ 614B. If the final text comparison module 616 determines that the text output$_1$ 614A and the text output$_2$ 614B match, the final text comparison module 616 can determine that the original audio 602 has not been compromised and can generate a final text output 626 directed to the destination system 604. If the final text comparison module 616 determines that the text output$_1$ 614A and the text output$_2$ 614B do not match, the final text comparison module 616 can determine that the original audio 602 has been compromised and can generate an alarm$_3$ 612C directed to the destination system 604.

Figure 7:
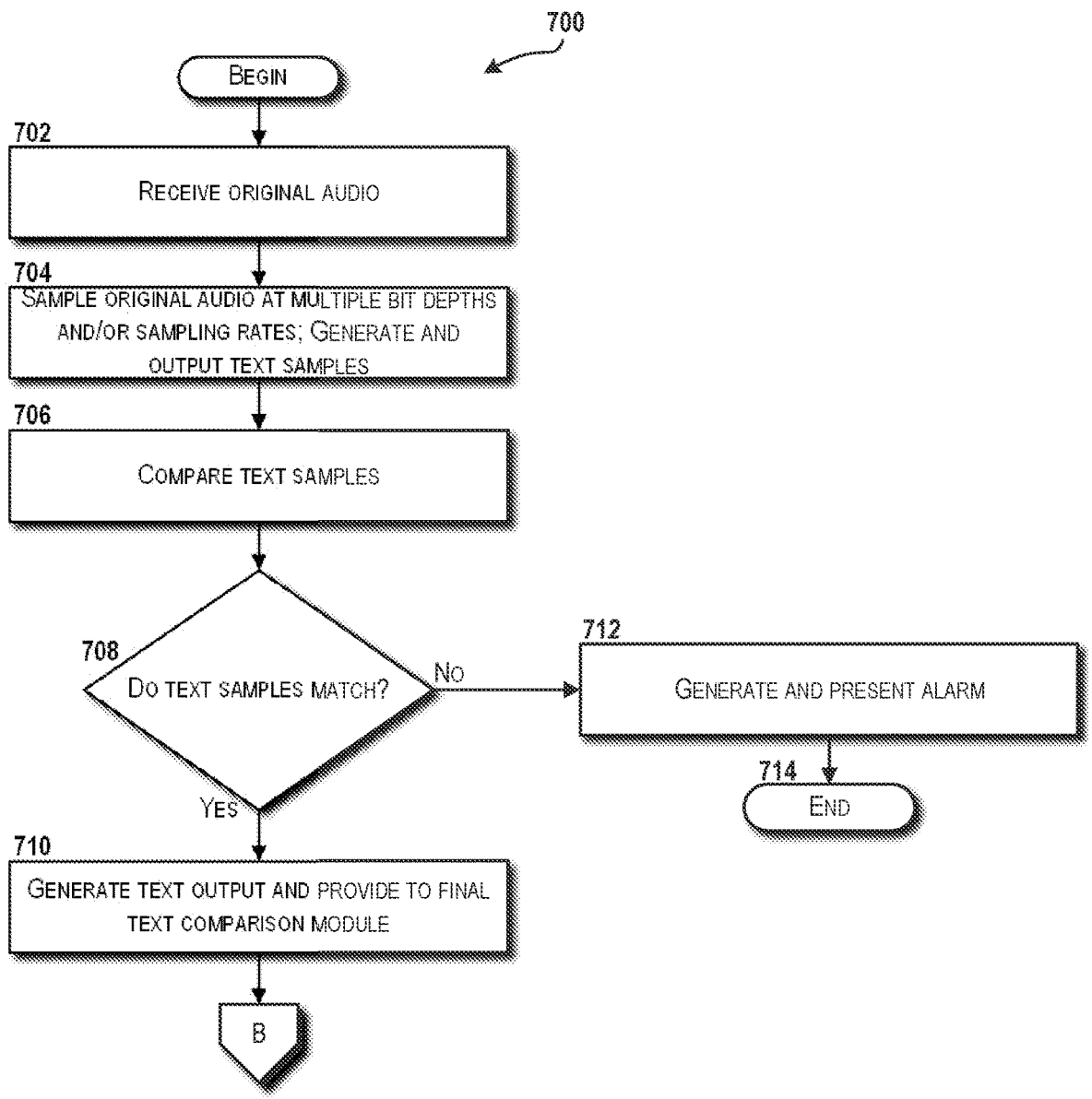
FIG. 7 is a flow diagram illustrating aspects of a method for comparing text generated from multiple audio samples, according to an illustrative embodiment.

Turning now to FIG. 7, a method 700 for comparing the text samples 608A, 608B generated from multiple audio samples will be described, according to an illustrative embodiment. The method 700 begins and proceeds to operation 702. At operation 702, the multi-rate sampler and text generator module 606 receives the original audio 602. From operation 702, the method 700 proceeds to operation 704. At operation 704, the multi-rate sampler and text generator module 606 samples the original audio 602 at multiple bit depths (e.g., 8-bit, 16-bit, 24-bit, etc.) and/or sampling rates (e.g., 44.1 kHz, 48 kHz, 96 kHz, 192 kHz, etc.) to create multiple audio samples of the original audio 602. Also at operation 704, the multi-rate sampler and text generator module 606 generates and outputs the text samples 608A-608N generated from the audio samples.

From operation 704, the method 700 proceeds to operation 706. At operation 706, the text comparison module$_1$ 610A compares the text samples 608A-608N. From operation 706, the method 700 proceeds to operation 708. At operation 708, the text comparison module$_1$ 610A determines if the text samples 608A-608N match. If the text comparison module$_1$ 610A determines that the text samples 608A-608N match, the method 700 proceeds to operation 710. At operation 710, the text comparison module$_1$ 610A generates the text output$_1$ 614A and provides the text output$_1$ 614A to the final text comparison module 616. From operation 710, the method 700 proceeds to operation 902 of the method 900 described herein below. If the text comparison module$_1$ 610A determines that the text samples 608A-608N do not match (i.e., there is some discrepancy among the texts), the method 700 proceeds to operation 712. At operation 712, the text comparison module$_1$ 610A generates and provides the alarm$_1$ 612A to the destination system 604. From operation 712, the method 700 proceeds to operation 714. At operation 714, the method 700 can end.

Figure 8:
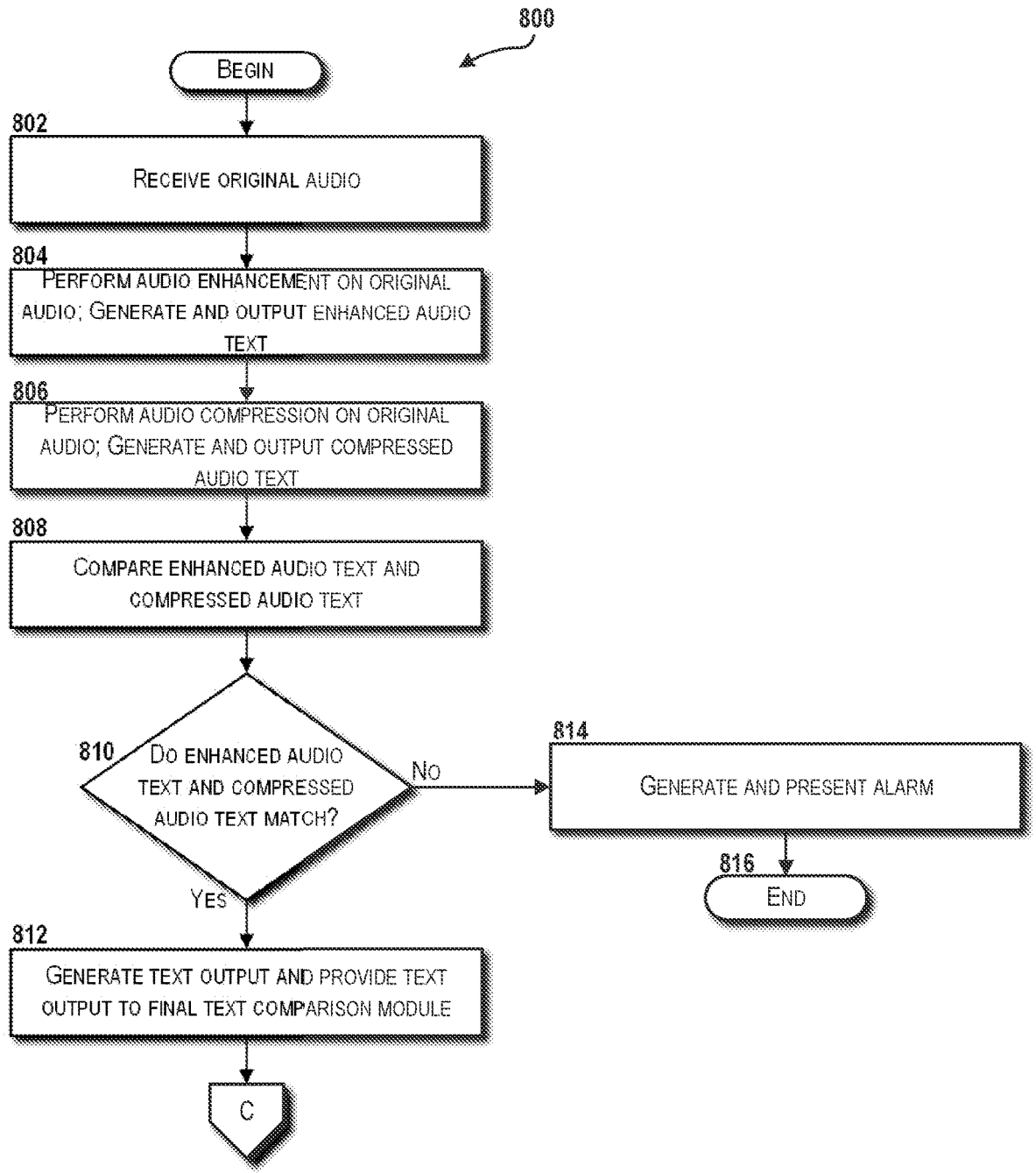
FIG. 8 is a flow diagram illustrating aspects of a method for comparing text generated from enhanced audio and compressed audio, according to an illustrative embodiment.

Turning now to FIG. 8, a method 800 for comparing text generated from the enhanced audio text 622 and the compressed audio text 624 will be described, according to an illustrative embodiment. The method 800 begins and proceeds to operation 802. At operation 802, both the multi-level audio enhancer and text generator module 618 and the multi-level audio compressor and text generator module 620 receive the original audio 602. From operation 802, the method 800 proceeds to operation 804. At operation 804, the multi-level audio enhancer and text generator module 618 performs audio enhancement on the original audio 602 to create enhanced audio. Also at operation 804, the multi-level audio enhancer and text generator module 618 generates and outputs the enhanced audio text 622.

From operation 804, the method 800 proceeds to operation 806. At operation 806, the multi-level audio compressor and text generator module 620 performs audio compression on the original audio 602. Also at operation 806, the multi-level audio compression and text generator module 620 generates and outputs the compressed audio text 624.

From operation 806, the method 800 proceeds to operation 808. At operation 808, the text comparison module$_2$ 610B compares the enhanced audio text 622 and the compressed audio text 624. From operation 808, the method 800 proceeds to operation 810. At operation 810, the text comparison module$_2$ 610B determines if the enhanced audio text 622 and the compressed audio text match 624 match. If the text comparison module$_2$ 610B determines that the enhanced audio text 622 and the compressed audio text 624 match, the method 800 proceeds to operation 812. At operation 812, the text comparison module$_2$610B generates the text output$_2$ 614B and provides the text output$_2$ 614B to the final text comparison module 616. From operation 812, the method 800 proceeds to operation 902 of the method 900 described herein below. If the text comparison module$_2$ 610B determines that the enhanced audio text 622 and the compressed audio text 624 do not match (i.e., there is some discrepancy among the texts), the method 800 proceeds to operation 814. At operation 814, the text comparison module$_2$610B generates and provides the alarm$_2$ 612B to the destination system 604. From operation 814, the method 800 proceeds to operation 816. The method 800 can end at operation 816.

Figure 9:
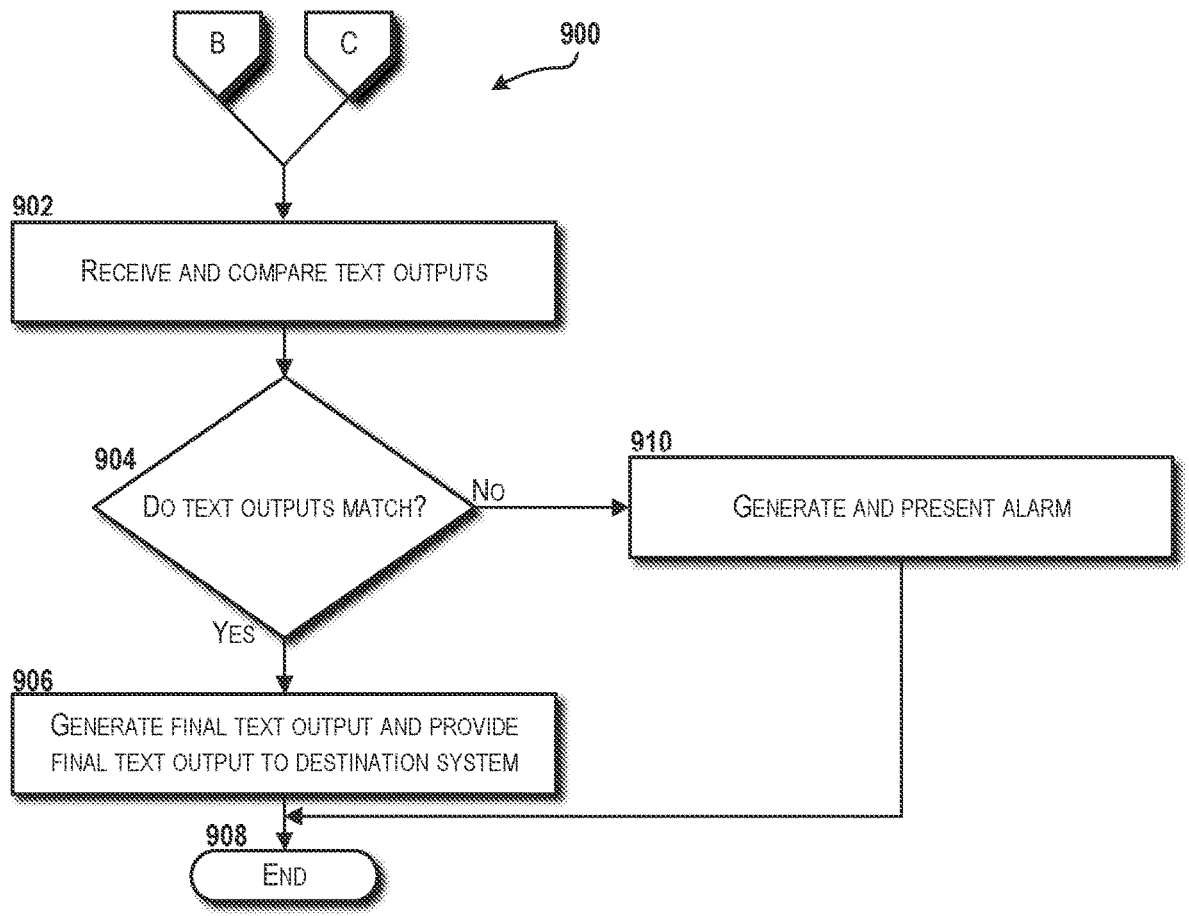
FIG. 9 is a flow diagram illustrating aspects of a method for comparing text outputs, according to an illustrative embodiment.

Turning now to FIG. 9, a method 900 for comparing the text outputs 614A, 614B obtained from the methods 700, 800 will be described, according to an illustrative embodiment. The method 900 begins as a continuation from operation 710 (see FIG. 7) and operation 812 (see FIG. 8) described above. At operation 902, the final text comparison module 616 receives and compares the text outputs 614A, 614B. From operation 902, the method 900 proceeds to operation 904. At operation 904, the final text comparison module 616 determines if the text outputs 614A, 614B match. If the final text comparison module 616 determines that the text outputs 614A, 614B match, then the method 900 proceeds to operation 906. At operation 906, the final text comparison module 616 generates the final text output 626 and provides the final text output 626 to the destination system 604. From operation 906, the method 900 proceeds to operation 908. The method 900 can end at operation 908.

Returning to operation 904, if the final text comparison module 616 determines that the text outputs 614A, 614B do not match, then the method 900 proceeds to operation 910. At operation 910, the final text comparison module 616 generates and presents the alarm$_3$ 612C to the destination system 604. From operation 910, the method 900 proceeds to operation 908. The method 900 can end at operation 908.

Figure 10:
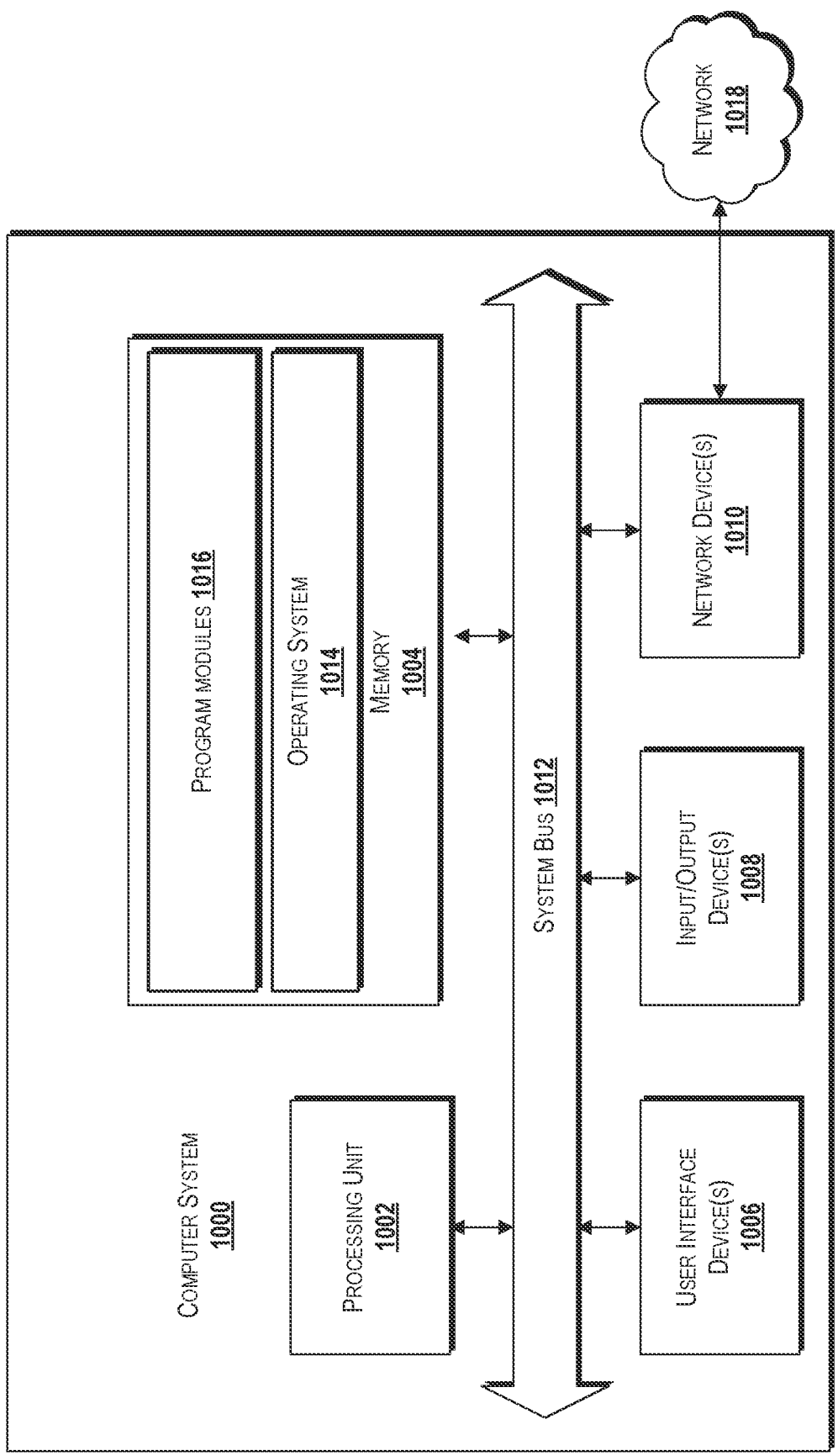
FIG. 10 is a block diagram illustrating an example computer system capable of implementing aspects of the embodiments presented herein.

Turning now to FIG. 10, a block diagram illustrating a computer system 1000 configured to provide the functionality described herein in accordance with various embodiments of the concepts and technologies disclosed herein. In some embodiments, the ICAM system 100 and/or the AAM system 600 can be configured the same as or similar to the computer system 1000. The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 1002 can be a single processing unit or a multiple processing unit that includes more than one processing component. Processing units are generally known, and therefore are not described in further detail herein.

The memory 1004 communicates with the processing unit 1002 via the system bus 1012. The memory 1004 can include a single memory component or multiple memory components. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1016 may include various software and/or program modules described herein. In some embodiments, the program modules 1016 in the ICAM system 100 configured like the computer system 1000 can include, for example, the image resolution reduction module 104, the ICAM module 106, the image reconstruction module 108, the image comparison module 110, the DLIC module 112, a classification comparison module 114, or a combination thereof. In some embodiments, the program modules 1016 in the AAM system 600 configured like the computer system 1000 can include, for example, the multi-rate sampler and text generator module 606, the text comparison modules 610A, 610B, the final text comparison module 616, or a combination thereof. In some embodiments, multiple implementations of the computer system 1000 can be used, wherein each implementation is configured to execute one or more of the program modules 1016. The program modules 1016 and/or other programs can be embodied in computer-readable media containing instructions that, when executed by the processing unit 1002, perform the methods described herein. According to embodiments, the program modules 1016 may be embodied in hardware, software, firmware, or any combination thereof. Although not shown in FIG. 10, it should be understood that the memory 1004 also can be configured to store the original image 102, the reduced resolution image 116, the ICAM classification 118, the reconstructed image 128, the adjust resolution instruction 130, the DLIC classification 136, the CNN 134, the ICAM output 138, combinations thereof, and/or other data disclosed herein.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium," "computer-readable storage medium," and variations thereof does not include waves or signals per se and/or communication media, and therefore should be construed as being directed to "non-transitory" media only.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network 1018. Examples of the network devices 1010 include, but are not limited to, a modem, a radio frequency ("RF") or infrared ("IR") transceiver, a telephonic interface, a bridge, a router, or a network card. The network 1018 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as WiMAX network, or a cellular network. Alternatively, the network 1018 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 11:
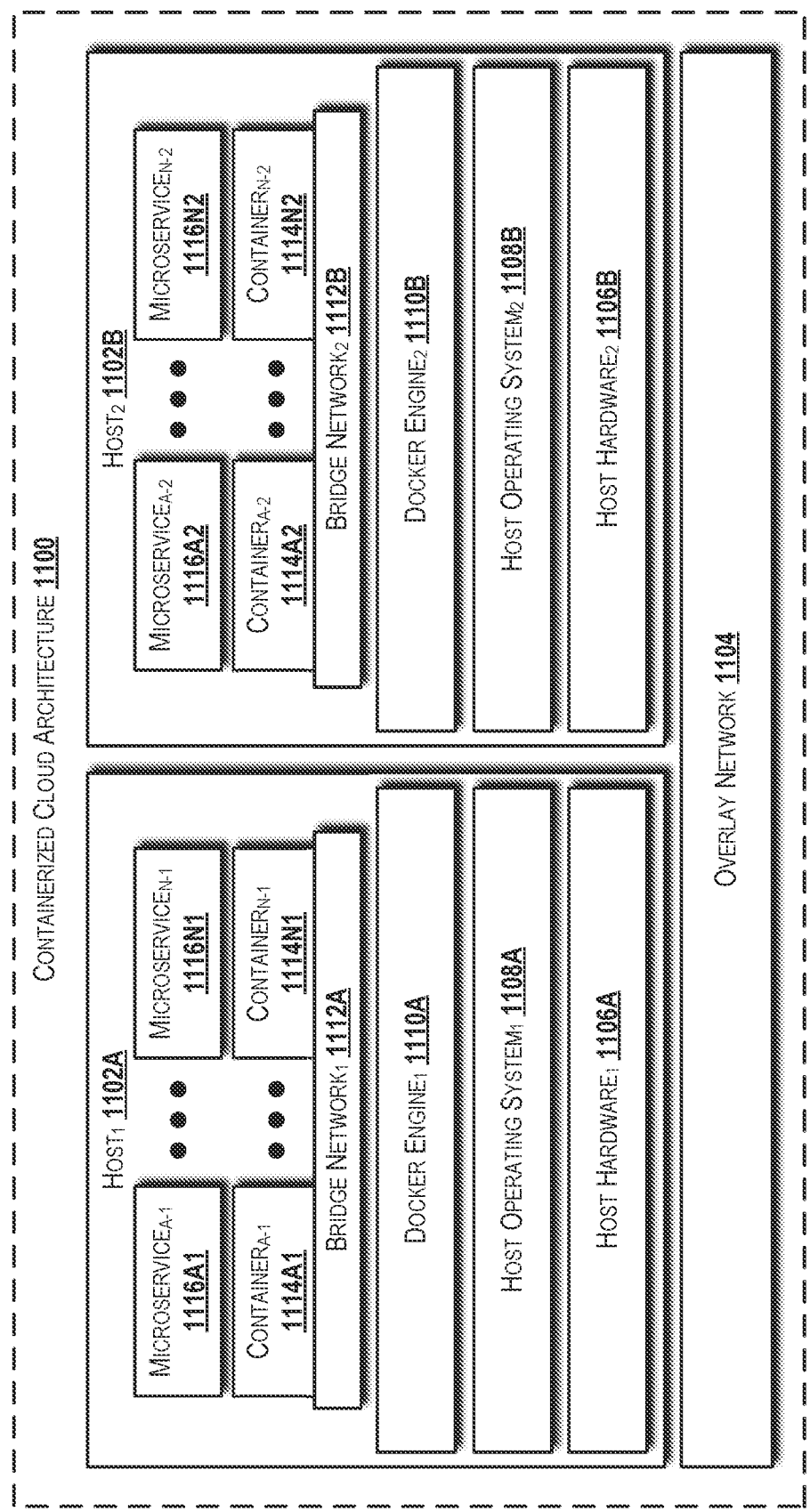
FIG. 11 is a block diagram illustrating an example containerized cloud architecture and components thereof capable of implementing aspects of the embodiments presented herein.

Turning now to FIG. 11, a block diagram illustrating an exemplary containerized cloud architecture 1100 capable of implementing, at least in part, aspects of the concepts and technologies disclosed herein will be described, according to an illustrative embodiment. In some embodiments, the ICAM system 100 and/or the audio attack mitigation system 600, at least in part, is implemented in the containerized cloud architecture 1100. The illustrated containerized cloud architecture 1100 includes a first host ("host$_1$") 1102A and a second host ("host$_2$") 1102B (at times referred to herein collectively as hosts 1102 or individually as host 1102) that can communicate via an overlay network 1104. Although two hosts 1102 are shown, the containerized cloud architecture 1100 can support any number of hosts 1102. The overlay network 1104 can enable communication among hosts 1102 in the same cloud network or hosts 1102 across different cloud networks. Moreover, the overlay network 1104 can enable communication among hosts 1102 owned and/or operated by the same or different entities.

The illustrated host$_1$ 1102A includes a host hardwares 1106A, a host operating system$_1$ 1108A, a DOCKER engine$_1$ 1110A, a bridge network$_1$ 1112A, container$_{A-1}$ through container$_{N-1}$ 1114A1-1114N1, and microservice$_{A-1}$ through microservice$_{N-1}$ 1116A1-1116N1. Similarly, the illustrated host$_2$ 1102B includes a host hardware$_2$ 1106B, a host operating system$_2$ 1108B, a DOCKER engine$_2$ 1110B, a bridge network$_2$ 1112B, container$_{A-2}$ through container$_{N-2}$ 1114A2-1114N2, and microservice$_{A-2}$ through microservice$_{N-2}$ 1116A2-1116N2.

The host hardwares 1106A and the host hardwares 1106B (at times referred to herein collectively or individually as host hardware 1106) can be implemented as bare metal hardware such as one or more physical servers. The host hardware 1106 alternatively can be implemented using hardware virtualization. In some embodiments, the host hardware 1106 can include compute resources, memory resources, and other hardware resources. These resources can be virtualized according to known virtualization techniques. A virtualization cloud architecture 1200 is described herein with reference to FIG. 12. Although the containerized cloud architecture 1100 and the virtualization cloud architecture 1200 are described separately, these architectures can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 1100 and the virtualized cloud architecture 1200 should not be construed as being limiting in any way.

Compute resources can include one or more hardware components that perform computations to process data and/or to execute computer-executable instructions. For example, the compute resources can execute instructions of the host operating systema 1108A and the host operating systems 1108B (at times referred to herein collectively as host operating systems 1108 or individually as host operating system 1108), the containers 1114A1-1114N1 and the containers 1114A2-1114N2 (at times referred to herein collectively as containers 1114 or individually as container 1114), and the microservices 1116A1-1116N1 and the microservices 1116A1-1116N1 (at times referred to herein collectively as microservices 1116 or individually as microservice 1116).

The compute resources of the host hardware 1106 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 1106 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources.

The other resource(s) of the host hardware 1106 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The host operating systems 1108 can be proprietary, open source, or closed source. In some embodiments, the host operating systems 1108 can be or can include one or more container operating systems designed specifically to host containers such as the containers 1114. For example, the host operating systems 1108 can be or can include FEDORA COREOS (available from RED HAT, INC), RANCHEROS (available from RANCHER), and/or BOTTLEROCKET (available from Amazon Web Services). In some embodiments, the host operating systems 1108 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 1100 can be implemented utilizing any containerization technologies. Presently, open-source container technologies, such as those available from DOCKER, INC., are the most widely used, and it appears will continue to be for the foreseeable future. For this reason, the containerized cloud architecture 1100 is described herein using DOCKER container technologies available from DOCKER, INC., such as the DOCKER engines 1110. Those skilled in the art will appreciate that other container technologies, such as KUBERNETES may also be applicable to implementing the concepts and technologies disclosed herein, and as such, the containerized cloud architecture 1100 is not limited to DOCKER container technologies. Moreover, although open-source container technologies are most widely used, the concepts and technologies disclosed here may be implemented using proprietary technologies or closed source technologies.

The DOCKER engines 1110 are based on open source containerization technologies available from DOCKER, INC. The DOCKER engines 1110 enable users (not shown) to build and containerize applications. The full breadth of functionality provided by the DOCKER engines 1110 and associated components in the DOCKER architecture are beyond the scope of the present disclosure. As such, the primary functions of the DOCKER engines 1110 will be described herein in brief, but this description should not be construed as limiting the functionality of the DOCKER engines 1110 or any part of the associated DOCKER architecture. Instead, those skilled in the art will understand the implementation of the DOCKER engines 1110 and other components of the DOCKER architecture to facilitate building and containerizing applications within the containerized cloud architecture 1100.

The DOCKER engine 1110 functions as a client-server application executed by the host operating system 1108. The DOCKER engine 1110 provides a server with a daemon process along with application programming interfaces ("APIs") that specify interfaces that applications can use to communicate with and instruct the daemon to perform operations. The DOCKER engine 1110 also provides a command line interface ("CLI") that uses the APIs to control and interact with the daemon through scripting and/or CLI commands. The daemon can create and manage objects such as images, containers, networks, and volumes. Although a single DOCKER engine 1110 is illustrated in each of the hosts 1102, multiple DOCKER engines 1110 are contemplated. The DOCKER engine(s) 1110 can be run in swarm mode.

The bridge networks 1112 enable the containers 1114 connected to the same bridge network to communicate. For example, the bridge networks 1112A enables communication among the containers 1114A1-1114N1, and the bridge network$_2$ 1112B enables communication among the containers 1114A2-1114N2. In some embodiments, the bridge networks 1112 are software network bridges implemented via the DOCKER bridge driver. The DOCKER bridge driver enables default and user-defined network bridges. The containers 1114 are runtime instances of images. The containers 1114 are described herein specifically as DOCKER containers, although other containerization technologies are contemplated as noted above. Each container 1114 can include an image, an execution environment, and a standard set of instructions The microservices 1116 are applications that provide a single function. In some embodiments, each of the microservices 1116 is provided by one of the containers 1114, although each of the containers 1114 may contain multiple microservices 1116. For example, the microservices 1116 can include, but are not limited, to server, database, and other executable applications to be run in an execution environment provided by a container 1114. The microservices 1116 can provide any type of functionality, and therefore all the possible functions cannot be listed herein. Those skilled in the art will appreciate the use of the microservices 1116 along with the containers 1114 to improve many aspects of the containerized cloud architecture 1100, such as reliability, security, agility, and efficiency, for example.

Figure 12:
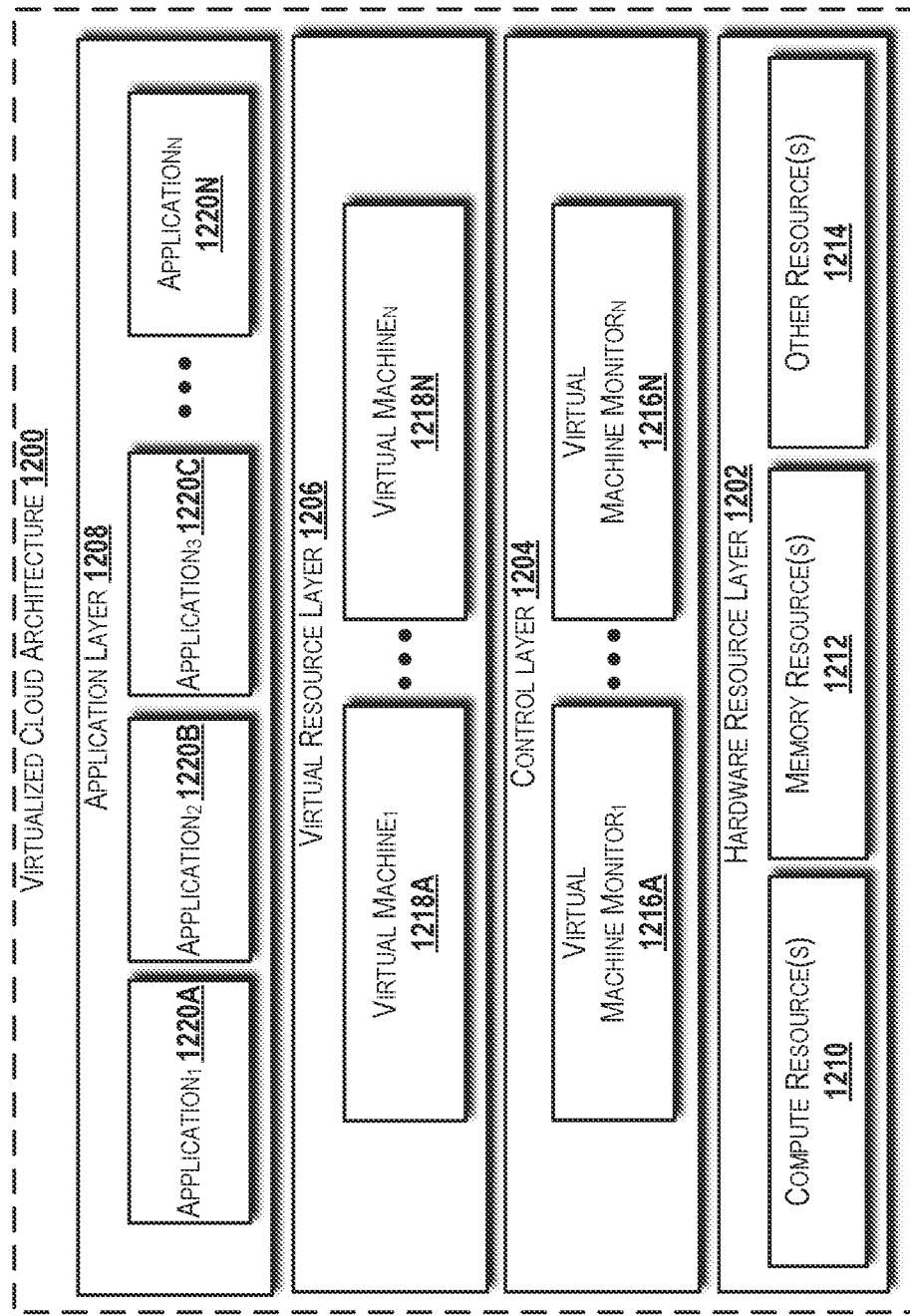
FIG. 12 is a block diagram illustrating an example virtualized cloud architecture and components thereof capable of implementing aspects of the embodiments presented herein.

Turning now to FIG. 12, a block diagram illustrating an example virtualized cloud architecture 1200 and components thereof will be described, according to an exemplary embodiment. The virtualized cloud architecture 1200 can be utilized to implement various elements disclosed herein. In some embodiments, the ICAM system 100 and/or the AAM system 600, at least in part, is implemented in the virtualized cloud architecture 1200.

The virtualized cloud architecture 1200 is a shared infrastructure that can support multiple services and network applications. The illustrated virtualized cloud architecture 1200 includes a hardware resource layer 1202, a control layer 1204, a virtual resource layer 1206, and an application layer 1208 that work together to perform operations as will be described in detail herein.

The hardware resource layer 1202 provides hardware resources, which, in the illustrated embodiment, include one or more compute resources 1210, one or more memory resources 1212, and one or more other resources 1214. The compute resource(s) 1210 can include one or more hardware components that perform computations to process data, and/or to execute computer-executable instructions of one or more application programs, operating systems, and/or other software. The compute resources 1210 can include one or more central processing units ("CPUs") configured with one or more processing cores. The compute resources 1210 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1210 can include one or more discrete GPUs. In some other embodiments, the compute resources 1210 can include CPU and GPU components that are configured in accordance with a co-processing CPU/GPU computing model, wherein the sequential part of an application executes on the CPU and the computationally-intensive part is accelerated by the GPU. The compute resources 1210 can include one or more system-on-chip ("SoC") components along with one or more other components, including, for example, one or more of the memory resources 1212, and/or one or more of the other resources 1214. In some embodiments, the compute resources 1210 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 1210 can be or can include one or more hardware components architected in accordance with an advanced reduced instruction set computing ("RISC") machine ("ARM") architecture, available for license from ARM HOLDINGS. Alternatively, the compute resources 1210 can be or can include one or more hardware components architected in accordance with an x86 architecture, such an architecture available from INTEL CORPORATION of Mountain View, California, and others. Those skilled in the art will appreciate the implementation of the compute resources 1210 can utilize various computation architectures, and as such, the compute resources 1210 should not be construed as being limited to any particular computation architecture or combination of computation architectures, including those explicitly disclosed herein.

The memory resource(s) 1212 can include one or more hardware components that perform storage operations, including temporary or permanent storage operations. In some embodiments, the memory resource(s) 1212 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1210.

The other resource(s) 1214 can include any other hardware resources that can be utilized by the compute resources(s) 1210 and/or the memory resource(s) 1212 to perform operations described herein. The other resource(s) 1214 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 1202 can be virtualized by one or more virtual machine monitors ("VMMs") 1216A-1216N (also known as "hypervisors;" hereinafter "VMMs 1216") operating within the control layer 1204 to manage one or more virtual resources that reside in the virtual resource layer 1206. The VMMs 1216 can be or can include software, firmware, and/or hardware that alone or in combination with other software, firmware, and/or hardware, manages one or more virtual resources operating within the virtual resource layer 1206.

The virtual resources operating within the virtual resource layer 1206 can include abstractions of at least a portion of the compute resources 1210, the memory resources 1212, the other resources 1214, or any combination thereof. These abstractions are referred to herein as virtual machines ("VMs"). In the illustrated embodiment, the virtual resource layer 1206 includes VMs 1218A-1218N (hereinafter "VMs 1218"). Each of the VMs 1218 can execute one or more applications 1220A-1220N in the application layer 1208.

Figure 13:
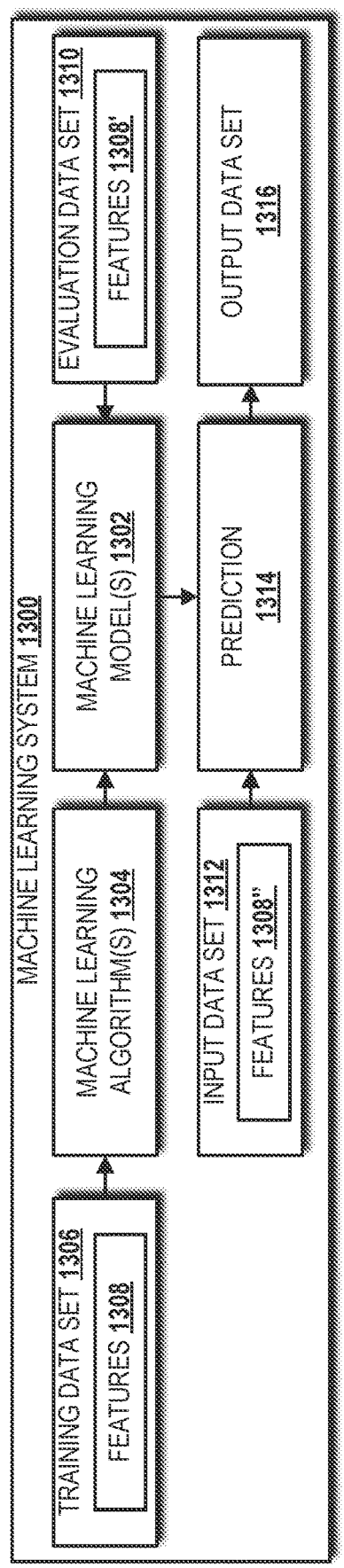
FIG. 13 is a diagram illustrating a machine learning system, according to an illustrative embodiment.

Turning now to FIG. 13, a machine learning system 1300 capable of implementing aspects of the embodiments disclosed herein will be described. In some embodiments, aspects of the ICAM system 100 and/or the AAM system 600 can use of machine learning and/or artificial intelligence applications. Accordingly, the ICAM system 100 and/or the AAM system 600 can include the machine learning system 1300 or can be in communication with the machine learning system 1300.

The illustrated machine learning system 1300 includes one or more machine learning models 1302. The machine learning models 1302 can include supervised and/or semi-supervised learning models. The machine learning model(s) 1302 can be created by the machine learning system 1300 based upon one or more machine learning algorithms 1304. The machine learning algorithm(s) 1304 can be any existing, well-known algorithm, any proprietary algorithms, or any future machine learning algorithm. Some example machine learning algorithms 1304 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1304 based upon the problem(s) to be solved by machine learning via the machine learning system 1300.

The machine learning system 1300 can control the creation of the machine learning models 1302 via one or more training parameters. In some embodiments, the training parameters are selected modelers at the direction of an enterprise, for example. Alternatively, in some embodiments, the training parameters are automatically selected based upon data provided in one or more training data sets 1306. The training parameters can include, for example, a learning rate, a model size, a number of training passes, data shuffling, regularization, and/or other training parameters known to those skilled in the art. The training data in the training data sets 1306.

The learning rate is a training parameter defined by a constant value. The learning rate affects the speed at which the machine learning algorithm 1304 converges to the optimal weights. The machine learning algorithm 1304 can update the weights for every data example included in the training data set 1306. The size of an update is controlled by the learning rate. A learning rate that is too high might prevent the machine learning algorithm 1304 from converging to the optimal weights. A learning rate that is too low might result in the machine learning algorithm 1304 requiring multiple training passes to converge to the optimal weights.

The model size is regulated by the number of input features ("features") 1308 in the training data set 1306. A greater the number of features 1308 yields a greater number of possible patterns that can be determined from the training data set 1306. The model size should be selected to balance the resources (e.g., compute, memory, storage, etc.) needed for training and the predictive power of the resultant machine learning model 1302.

The number of training passes indicates the number of training passes that the machine learning algorithm 1304 makes over the training data set 1306 during the training process. The number of training passes can be adjusted based, for example, on the size of the training data set 1306, with larger training data sets being exposed to fewer training passes in consideration of time and/or resource utilization. The effectiveness of the resultant machine learning model 1302 can be increased by multiple training passes.

Data shuffling is a training parameter designed to prevent the machine learning algorithm 1304 from reaching false optimal weights due to the order in which data contained in the training data set 1306 is processed. For example, data provided in rows and columns might be analyzed first row, second row, third row, etc., and thus an optimal weight might be obtained well before a full range of data has been considered. By data shuffling, the data contained in the training data set 1306 can be analyzed more thoroughly and mitigate bias in the resultant machine learning model 1302.

Regularization is a training parameter that helps to prevent the machine learning model 1302 from memorizing training data from the training data set 1306. In other words, the machine learning model 1302 fits the training data set 1306, but the predictive performance of the machine learning model 1302 is not acceptable. Regularization helps the machine learning system 1300 avoid this overfitting/memorization problem by adjusting extreme weight values of the features 1308. For example, a feature that has a small weight value relative to the weight values of the other features in the training data set 1306 can be adjusted to zero.

The machine learning system 1300 can determine model accuracy after training by using one or more evaluation data sets 1310 containing the same features 1308' as the features 1308 in the training data set 1306. This also prevents the machine learning model 1302 from simply memorizing the data contained in the training data set 1306. The number of evaluation passes made by the machine learning system 1300 can be regulated by a target model accuracy that, when reached, ends the evaluation process and the machine learning model 1302 is considered ready for deployment.

After deployment, the machine learning model 1302 can perform a prediction operation ("prediction") 1314 with an input data set 1312 having the same features 1308" as the features 1308 in the training data set 1306 and the features 1308' of the evaluation data set 1310. The results of the prediction 1314 are included in an output data set 1316 consisting of predicted data. The machine learning model 1302 can perform other operations, such as regression, classification, and others. As such, the example illustrated in FIG. 13 should not be construed as being limiting in any way.

Figure 14:
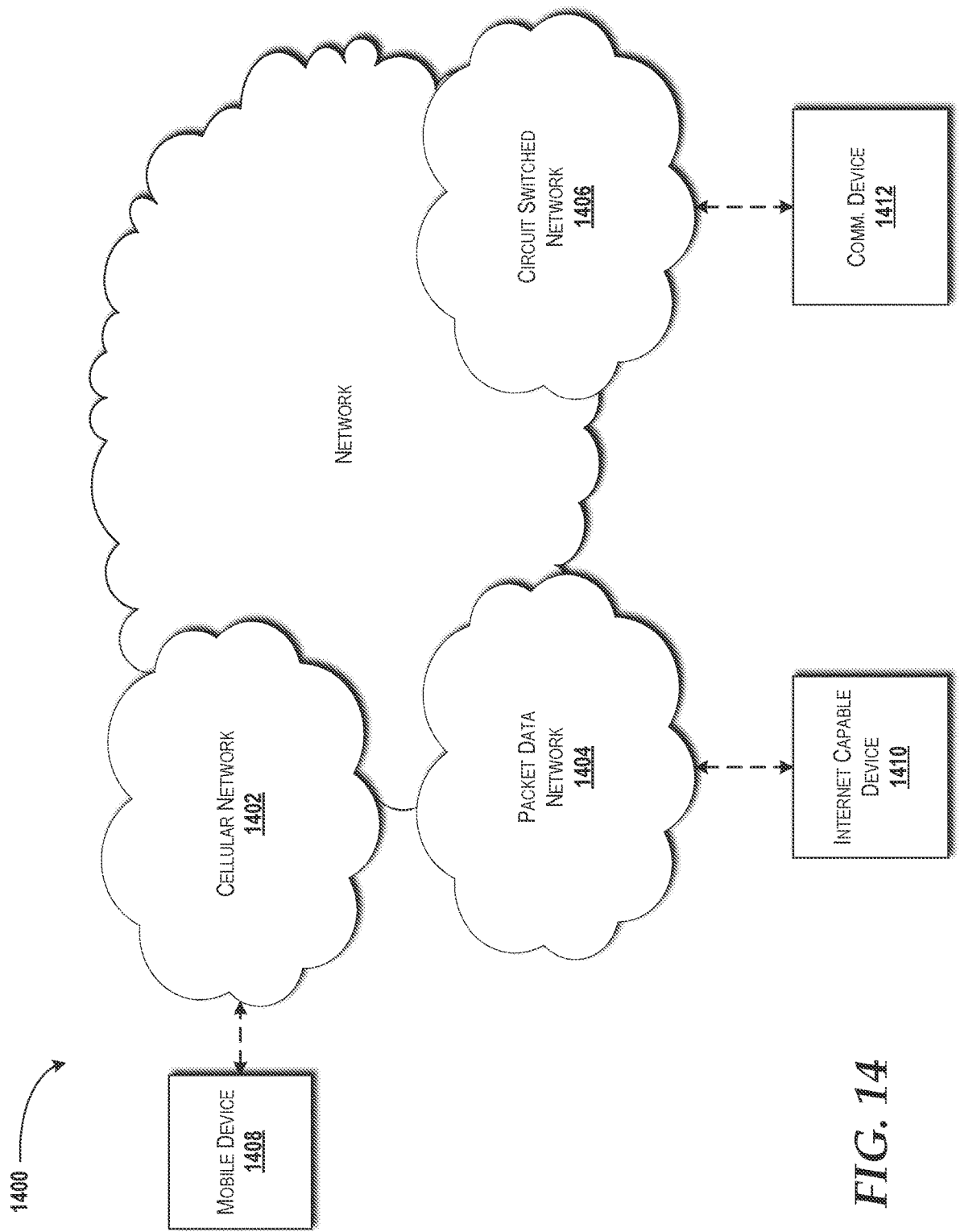
FIG. 14 is a diagram illustrating a network, according to an illustrative embodiment.

Turning now to FIG. 14, details of a network 1400 are illustrated, according to an illustrative embodiment. The network 1400 includes a cellular network 1402, a packet data network 1404, and a circuit switched network 1406. In some embodiments, the network 818 is or includes the network 1400. Moreover, the ICAM system 100 and/or the AAM system 600 can be configured to communicate over the network 1400.

The cellular network 1402 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, and the like. The cellular network 1402 also includes radios and nodes for receiving and transmitting voice, data, and combinations thereof to and from radio transceivers, networks, the packet data network 1404, and the circuit switched network 1406.

A mobile communications device 1408, such as, for example, a cellular telephone, a user equipment, a mobile terminal, a PDA, a laptop computer, a handheld computer, and combinations thereof, can be operatively connected to the cellular network 1402. The cellular network 1402 can be configured as a GSM) network and can provide data communications via GPRS and/or EDGE. Additionally, or alternatively, the cellular network 1402 can be configured as a 3G Universal Mobile Telecommunications System ("UMTS") network and can provide data communications via the HSPA protocol family, for example, HSDPA, EUL, and HSPA+. The cellular network 1402 also is compatible with 4G mobile communications standards such as LTE, 5G mobile communications standards, or the like, as well as evolved and future mobile standards.

The packet data network 1404 includes various systems, devices, servers, computers, databases, and other devices in communication with one another, as is generally known. In some embodiments, the packet data network 1404 is or includes one or more WI-FI networks, each of which can include one or more WI-FI access points, routers, switches, and other WI-FI network components. The packet data network 1404 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 1404 includes or is in communication with the Internet. The circuit switched network 1406 includes various hardware and software for providing circuit switched communications. The circuit switched network 1406 may include, or may be, what is often referred to as a plain old telephone system ("POTS"). The functionality of a circuit switched network 1406 or other circuit-switched network are generally known and will not be described herein in detail.

The illustrated cellular network 1402 is shown in communication with the packet data network 1404 and a circuit switched network 1406, though it should be appreciated that this is not necessarily the case. One or more Internet-capable devices 1408 such as a laptop, a portable device, or another suitable device, can communicate with one or more cellular networks 1402, and devices connected thereto, through the packet data network 1404. It also should be appreciated that the Internet-capable device 1410 can communicate with the packet data network 1404 through the circuit switched network 1406, the cellular network 1402, and/or via other networks (not illustrated).

As illustrated, a communications device 1412, for example, a telephone, facsimile machine, modem, computer, or the like, can be in communication with the circuit switched network 1406, and therethrough to the packet data network 1404 and/or the cellular network 1402. It should be appreciated that the communications device 1412 can be an Internet-capable device, and can be substantially similar to the Internet-capable device 1410.

Based on the foregoing, it should be appreciated that concepts and technologies directed to image classification attack mitigation have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method, comprising:
   processing, by a computing system, an original audio signal in a first fashion to generate a first digital audio signal;
   processing, by the computing system, the original audio signal in a second fashion, different than the first fashion, to generate a second digital audio signal different than the first digital audio signal;
   converting, by the computing system, the first digital audio signal and the second digital audio signal into first text and second text, respectively;
   determining, by the computing system, a mismatch between the first text and the second text; and
   based at least in part on the mismatch, sending an alarm indication from the computing system to a remote device.

2. The method of claim 1, wherein:
   processing the original audio signal in the first fashion includes sampling the original audio signal at a first bit depth to generate the first digital audio signal; and
   processing the original audio signal in the second fashion includes sampling the original audio signal at a second bit depth, different than the first bit depth, to generate the second digital audio signal.

3. The method of claim 1, wherein:
processing the original audio signal in the first fashion includes sampling the original audio signal at a first sampling rate to generate the first digital audio signal; and
processing the original audio signal in the second fashion includes sampling the original audio signal at a second sampling rate, different than the first sampling rate, to generate the second digital audio signal.

4. The method of claim 1, wherein:
processing the original audio signal in the first fashion includes sampling the original audio signal to generate the first digital audio signal; and
processing the original audio signal in the second fashion includes enhancing the original audio signal to generate the second digital audio signal.

5. The method of claim 1, wherein:
processing the original audio signal in the first fashion includes sampling the original audio signal to generate the first digital audio signal; and
processing the original audio signal in the second fashion includes compressing the original audio signal to generate the second digital audio signal.

6. The method of claim 1, wherein:
processing the original audio signal in the first fashion includes enhancing the original audio signal to generate the first digital audio signal; and
processing the original audio signal in the second fashion includes compressing the original audio signal to generate the second digital audio signal.

7. The method of claim 1, further comprising:
receiving the original audio signal by a voice-enabled system configured to control an operation of a home security component.

8. The method of claim 7, wherein:
the home security component comprises a smart lock; and
the voice-enabled system is configured to control operation of the smart lock in response to voice commands.

9. A system, comprising:
one or more processors; and
one or more non-transitory computer-readable mediums encoded with instructions which, when executed by the one or more processors, cause the system to:
process an original audio signal in a first fashion to generate a first digital audio signal;
process the original audio signal in a second fashion, different than the first fashion, to generate a second digital audio signal different than the first digital audio signal;
convert the first digital audio signal and the second digital audio signal into first text and second text, respectively;
determine a mismatch between the first text and the second text; and
based at least in part on the mismatch, send an alarm indication to a remote device.

10. The system of claim 9, wherein the one or more non-transitory computer-readable mediums are further encoded with additional instructions which, when executed by the one or more processors, further cause the system to:
process the original audio signal in the first fashion at least in part by sampling the original audio signal at a first bit depth to generate the first digital audio signal; and
process the original audio signal in the second fashion at least in part by sampling the original audio signal at a second bit depth, different than the first bit depth, to generate the second digital audio signal.

11. The system of claim 9, wherein the one or more non-transitory computer-readable mediums are further encoded with additional instructions which, when executed by the one or more processors, further cause the system to:
process the original audio signal in the first fashion at least in part by sampling the original audio signal at a first sampling rate to generate the first digital audio signal; and
process the original audio signal in the second fashion at least in part by sampling the original audio signal at a second sampling rate, different than the first sampling rate, to generate the second digital audio signal.

12. The system of claim 9, wherein the one or more non-transitory computer-readable mediums are further encoded with additional instructions which, when executed by the one or more processors, further cause the system to:
process the original audio signal in the first fashion at least in part by sampling the original audio signal to generate the first digital audio signal; and
process the original audio signal in the second fashion at least in part by enhancing the original audio signal to generate the second digital audio signal.

13. The system of claim 9, wherein the one or more non-transitory computer-readable mediums are further encoded with additional instructions which, when executed by the one or more processors, further cause the system to:
process the original audio signal in the first fashion at least in part by sampling the original audio signal to generate the first digital audio signal; and
process the original audio signal in the second fashion at least in part by compressing the original audio signal to generate the second digital audio signal.

14. The system of claim 9, wherein the one or more non-transitory computer-readable mediums are further encoded with additional instructions which, when executed by the one or more processors, further cause the system to:
process the original audio signal in the first fashion at least in part by enhancing the original audio signal to generate the first digital audio signal; and
process the original audio signal in the second fashion at least in part by compressing the original audio signal to generate the second digital audio signal.

15. The system of claim 9, wherein the one or more non-transitory computer-readable mediums are further encoded with additional instructions which, when executed by the one or more processors, further cause the system to:
control an operation of a home security component in response to receipt of the original audio signal.

16. The system of claim 15, wherein the home security component comprises a smart lock.

17. One or more non-transitory computer-readable mediums encoded with instructions which, when executed by one or more processors of a system, cause the system to:
process an original audio signal in a first fashion to generate a first digital audio signal;
process the original audio signal in a second fashion, different than the first fashion, to generate a second digital audio signal different than the first digital audio signal;
convert the first digital audio signal and the second digital audio signal into first text and second text, respectively;
determine a mismatch between the first text and the second text; and
based at least in part on the mismatch, send an alarm indication to a remote device.

18. The one or more non-transitory computer-readable mediums of claim 17, further encoded with additional instructions which, when executed by the one or more processors, further cause the system to:
process the original audio signal in the first fashion at least in part by sampling the original audio signal at a first bit depth to generate the first digital audio signal; and
process the original audio signal in the second fashion at least in part by sampling the original audio signal at a second bit depth, different than the first bit depth, to generate the second digital audio signal.

19. The one or more non-transitory computer-readable mediums of claim 17, further encoded with additional instructions which, when executed by the one or more processors, further cause the system to:
process the original audio signal in the first fashion at least in part by sampling the original audio signal at a first sampling rate to generate the first digital audio signal; and
process the original audio signal in the second fashion at least in part by sampling the original audio signal at a second sampling rate, different than the first sampling rate, to generate the second digital audio signal.

20. The one or more non-transitory computer-readable mediums of claim 17, further encoded with additional instructions which, when executed by the one or more processors, further cause the system to:
process the original audio signal in the first fashion at least in part by enhancing the original audio signal to generate the first digital audio signal; and
process the original audio signal in the second fashion at least in part by compressing the original audio signal to generate the second digital audio signal.

\* \* \* \* \*